US012803095B2

(12) United States Patent
Lee et al.

(10) Patent No.: US 12,803,095 B2
(45) Date of Patent: Nov. 17, 2026

(54) BATTERY MODULE AND BATTERY PACK INCLUDING THE SAME

(71) Applicant: LG ENERGY SOLUTION, LTD., Seoul (KR)

(72) Inventors: Jung Hoon Lee, Daejeon (KR); Jaehun Yang, Daejeon (KR); Seho Kim, Daejeon (KR); Dooseung Kim, Daejeon (KR); Jeong Gi Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 565 days.

(21) Appl. No.: 18/283,727

(22) PCT Filed: Jan. 5, 2023

(86) PCT No.: PCT/KR2023/000209
§ 371 (c)(1),
(2) Date: Sep. 22, 2023

(87) PCT Pub. No.: WO2023/136545
PCT Pub. Date: Jul. 20, 2023

(65) Prior Publication Data

US 2024/0170782 A1 May 23, 2024

(30) Foreign Application Priority Data

Jan. 11, 2022 (KR) ........................ 10-2022-0003810

(51) Int. Cl.
*H01M 50/242* (2021.01)
*H01M 10/613* (2014.01)
(Continued)

(52) U.S. Cl.
CPC ....... *H01M 50/242* (2021.01); *H01M 10/613* (2015.04); *H01M 10/6567* (2015.04);
(Continued)

(58) Field of Classification Search
CPC ............. H01M 50/242; H01M 50/262; H01M 50/211; H01M 50/505; H01M 10/613; H01M 10/6567; H01M 2220/20
See application file for complete search history.

(56) References Cited

U.S. PATENT DOCUMENTS 10,096,806 B2 10/2018 Pinon et al.
2003/0017387 A1 * 1/2003 Marukawa .......... H01M 50/209 429/178
(Continued)

FOREIGN PATENT DOCUMENTS

CN 109844996 A 6/2019
CN 110710022 A 1/2020
(Continued)

OTHER PUBLICATIONS

Machine Translation of WO-2020031620-A1 (Apr. 20, 2026) (Year: 2026).*
(Continued)

*Primary Examiner* — Matthew J Merkling
(74) *Attorney, Agent, or Firm* — Birch, Stewart, Kolasch & Birch, LLP

(57) ABSTRACT

Discussed is a battery module that may include a battery cell stack including a plurality of battery cells arranged along a first direction; side plates covering each of opposite side surfaces of the battery cell stack along the first direction, respectively; a busbar frame covering one surface of the battery cell stack in a direction in which electrode leads of the plurality of battery cells protrude; and a disc spring part located on an outside of a side plate of the side plates. The disc spring part is compressed in a direction parallel to the first direction.

16 Claims, 18 Drawing Sheets

(51) Int. Cl.
*H01M 10/6567* (2014.01)
*H01M 50/211* (2021.01)
*H01M 50/262* (2021.01)
*H01M 50/505* (2021.01)

(52) U.S. Cl.
CPC ....... *H01M 50/211* (2021.01); *H01M 50/262* (2021.01); *H01M 50/505* (2021.01); *H01M 2220/20* (2013.01)

(56) References Cited

U.S. PATENT DOCUMENTS

| | | | | |
|---|---|---|---|---|
| 2011/0262797 | A1* | 10/2011 | Kim | H01M 10/4207 429/149 |
| 2013/0108902 | A1 | 5/2013 | Kristofek et al. | |
| 2016/0308242 | A1 | 10/2016 | Ju | |
| 2018/0076487 | A1* | 3/2018 | Lee | H01M 50/264 |
| 2019/0366875 | A1 | 12/2019 | Hong et al. | |
| 2020/0006729 | A1 | 1/2020 | Hayakawa | |
| 2020/0076025 | A1 | 3/2020 | Jo et al. | |
| 2020/0194753 | A1 | 6/2020 | Fujiwara et al. | |
| 2021/0083254 | A1* | 3/2021 | You | H01M 50/50 |
| 2021/0265685 | A1 | 8/2021 | Jeong et al. | |
| 2021/0296728 | A1 | 9/2021 | Kim et al. | |
| 2021/0320360 | A1 | 10/2021 | Chen et al. | |
| 2021/0344057 | A1 | 11/2021 | Seo et al. | |
| 2021/0351455 | A1 | 11/2021 | Kim et al. | |
| 2021/0402884 | A1 | 12/2021 | Wang et al. | |
| 2022/0131225 | A1 | 4/2022 | Back et al. | |
| 2022/0140428 | A1 | 5/2022 | Chi et al. | |
| 2022/0311100 | A1 | 9/2022 | Lim et al. | |
| 2022/0344758 | A1 | 10/2022 | Park et al. | |
| 2022/0393283 | A1 | 12/2022 | Choi et al. | |
| 2023/0072893 | A1 | 3/2023 | Jang et al. | |
| 2024/0014526 | A1 | 1/2024 | Park et al. | |
| 2024/0250359 | A1 | 7/2024 | He et al. | |

FOREIGN PATENT DOCUMENTS

| | | | | | |
|---|---|---|---|---|---|
| CN | 210052766 | U | | 2/2020 | |
| DE | 102020201165 | A1 | * | 8/2021 | H01M 50/213 |
| EP | 3 125 332 | A1 | | 2/2017 | |
| EP | 2 771 940 | B1 | | 5/2020 | |
| EP | 3 859 853 | A1 | | 8/2021 | |
| EP | 3 883 045 | A1 | | 9/2021 | |
| EP | 3 916 893 | A1 | | 12/2021 | |
| JP | 2001-236937 | A | | 8/2001 | |
| JP | 2003-36830 | A | | 2/2003 | |
| JP | 5229303 | B2 | | 7/2013 | |
| JP | 5318844 | B2 | * | 10/2013 | |
| JP | 2014-535140 | A | | 12/2014 | |
| JP | 2016-85895 | A | | 5/2016 | |
| JP | 5931376 | B2 | | 6/2016 | |
| JP | 2018-133152 | A | | 8/2018 | |
| JP | 2020-27693 | A | | 2/2020 | |
| JP | 2020-35716 | A | | 3/2020 | |
| JP | 2020035716 | A | * | 3/2020 | |
| JP | 6796188 | B2 | | 12/2020 | |
| JP | 2021-140994 | A | | 9/2021 | |
| JP | 2021-535556 | A | | 12/2021 | |
| JP | 2023-509736 | A | | 3/2023 | |
| KR | 10-2016-0062448 | A | | 6/2016 | |
| KR | 10-2017-0013005 | A | | 2/2017 | |
| KR | 10-1781923 | B1 | | 9/2017 | |
| KR | 10-2020-0086172 | A | | 7/2020 | |
| KR | 10-2020-0112246 | A | | 10/2020 | |
| KR | 10-2021-0000548 | A | | 1/2021 | |
| KR | 20210015547 | A | * | 2/2021 | H01M 50/588 |
| KR | 10-2021-0053086 | A | | 5/2021 | |
| KR | 10-2021-0060414 | A | | 5/2021 | |
| KR | 10-2271384 | B1 | | 6/2021 | |
| KR | 10-2021-0094369 | A | | 7/2021 | |
| KR | 10-2021-0103832 | A | | 8/2021 | |
| KR | 10-2021-0112919 | A | | 9/2021 | |
| KR | 10-2021-0133566 | A | | 11/2021 | |
| WO | WO-2020031620 | A1 | * | 2/2020 | H01M 50/209 |

OTHER PUBLICATIONS

Machine Translation of JP-2020035716-A (Apr. 20, 2026) (Year: 2026).*
Machine Translation of KR-20210015547-A (Apr. 20, 2026) (Year: 2026).*
Machine Translation of DE-102020201165-A1 (Apr. 21, 2026) (Year: 2026).*
Machine Translation of JP-5318844-B2 (Apr. 21, 2026) (Year: 2026).*
Machine Translation of KR_20210015547 (Apr. 30, 2026) (Year: 2026).*
Extended European Search Report for European Application No. 23740389.4, dated Nov. 5, 2024.
International Search Report for PCT/KR2023/000209 mailed on Apr. 3, 2023.

* cited by examiner

【FIG. 1】(Conventional Art)
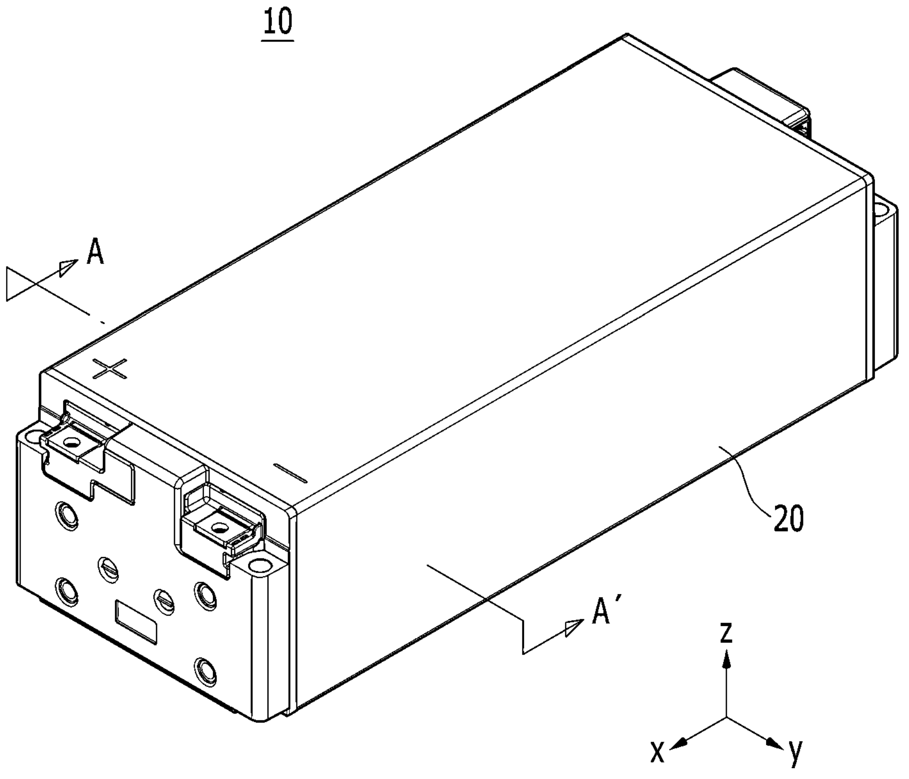

【FIG. 2】(Conventional Art)
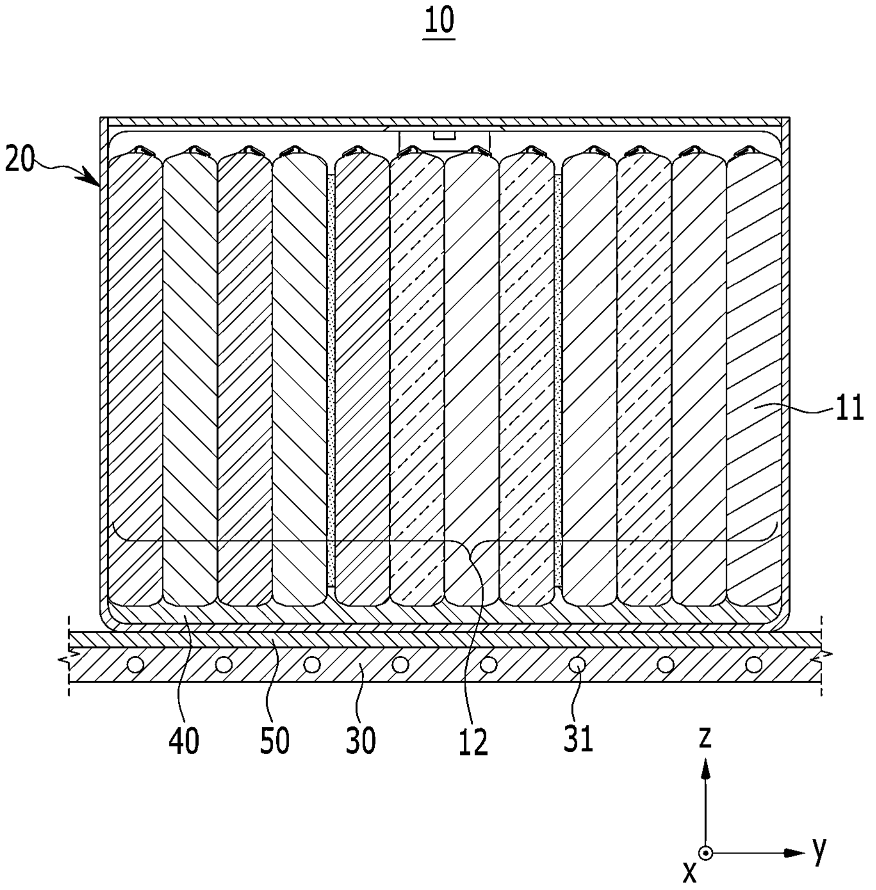

【FIG. 3】
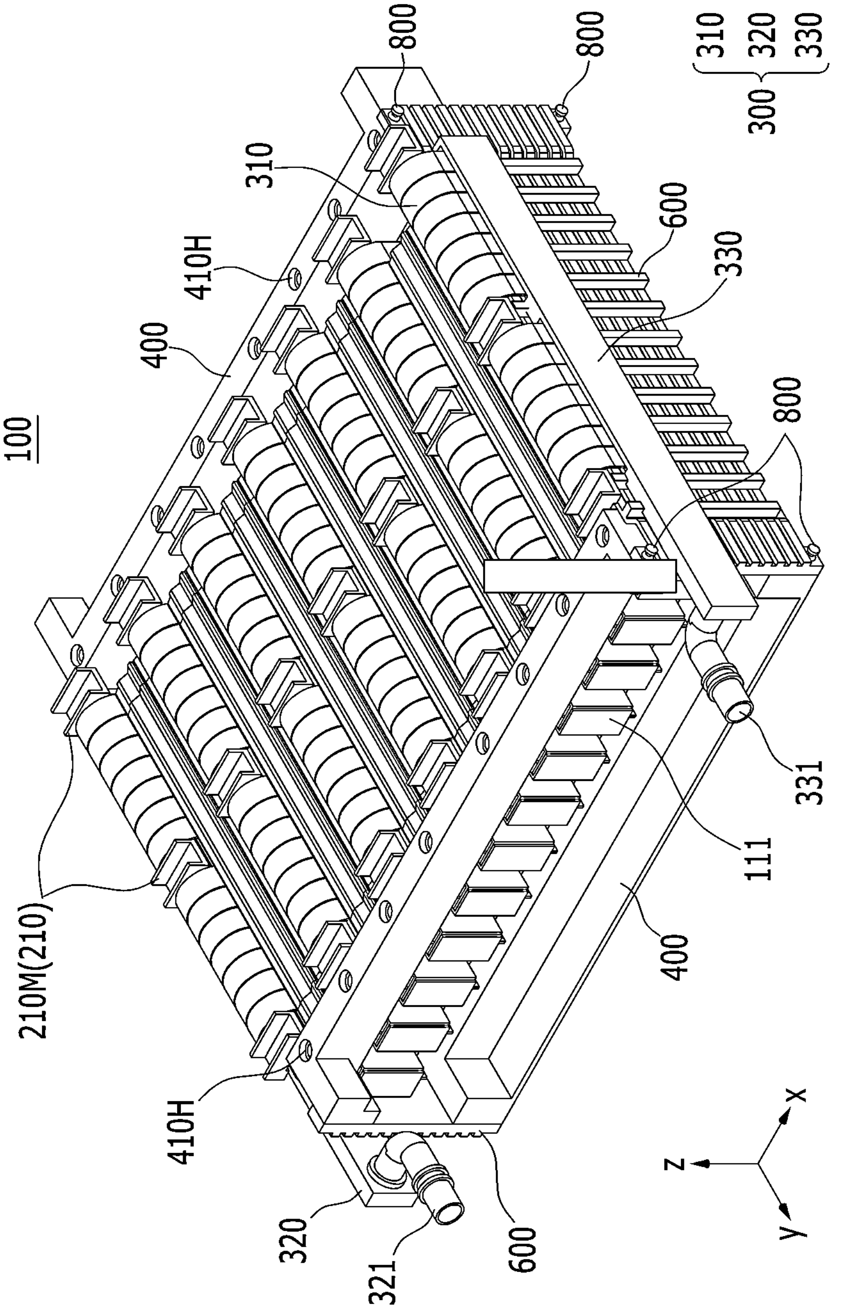

【FIG. 4】
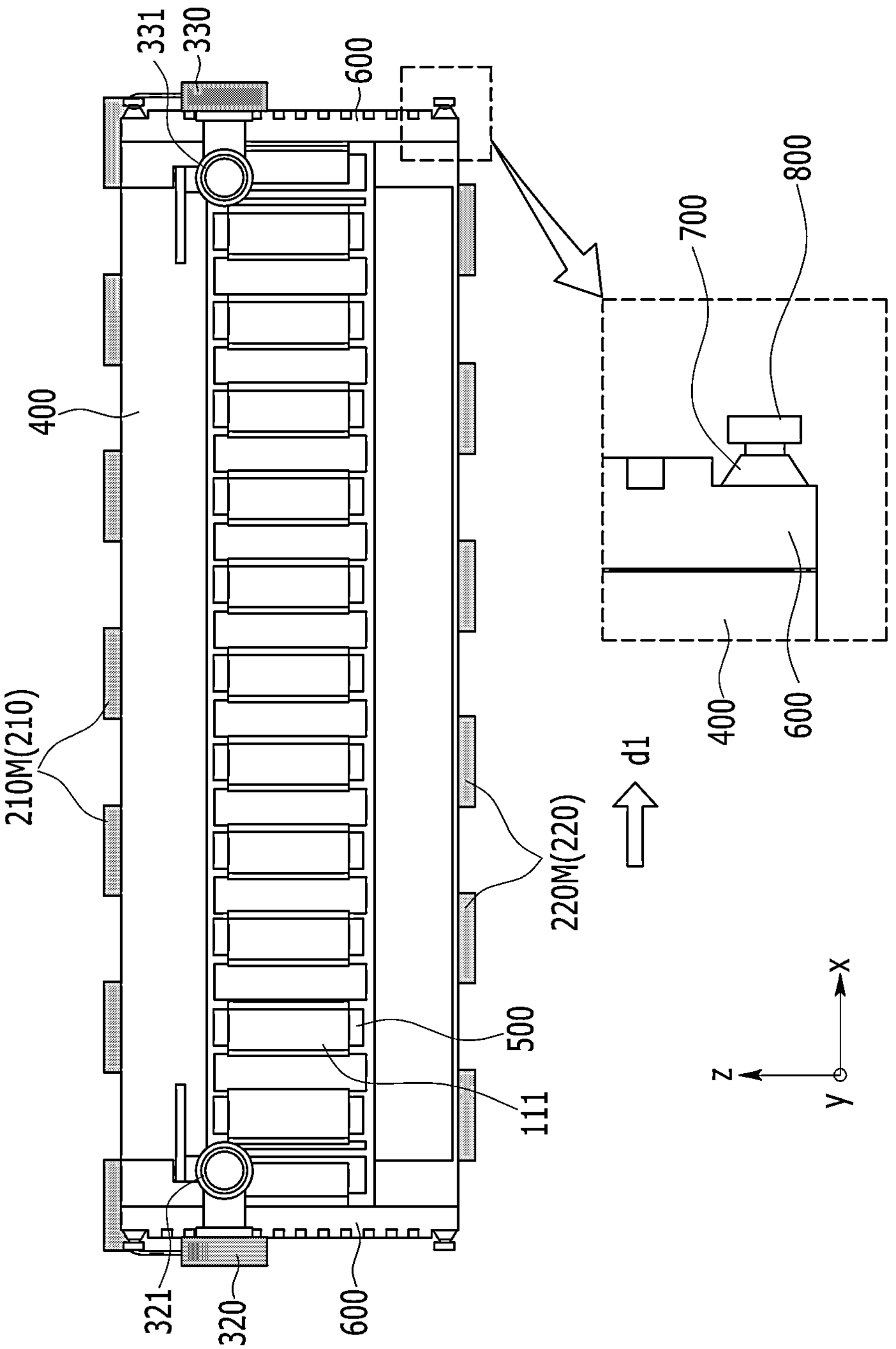

【FIG. 5】
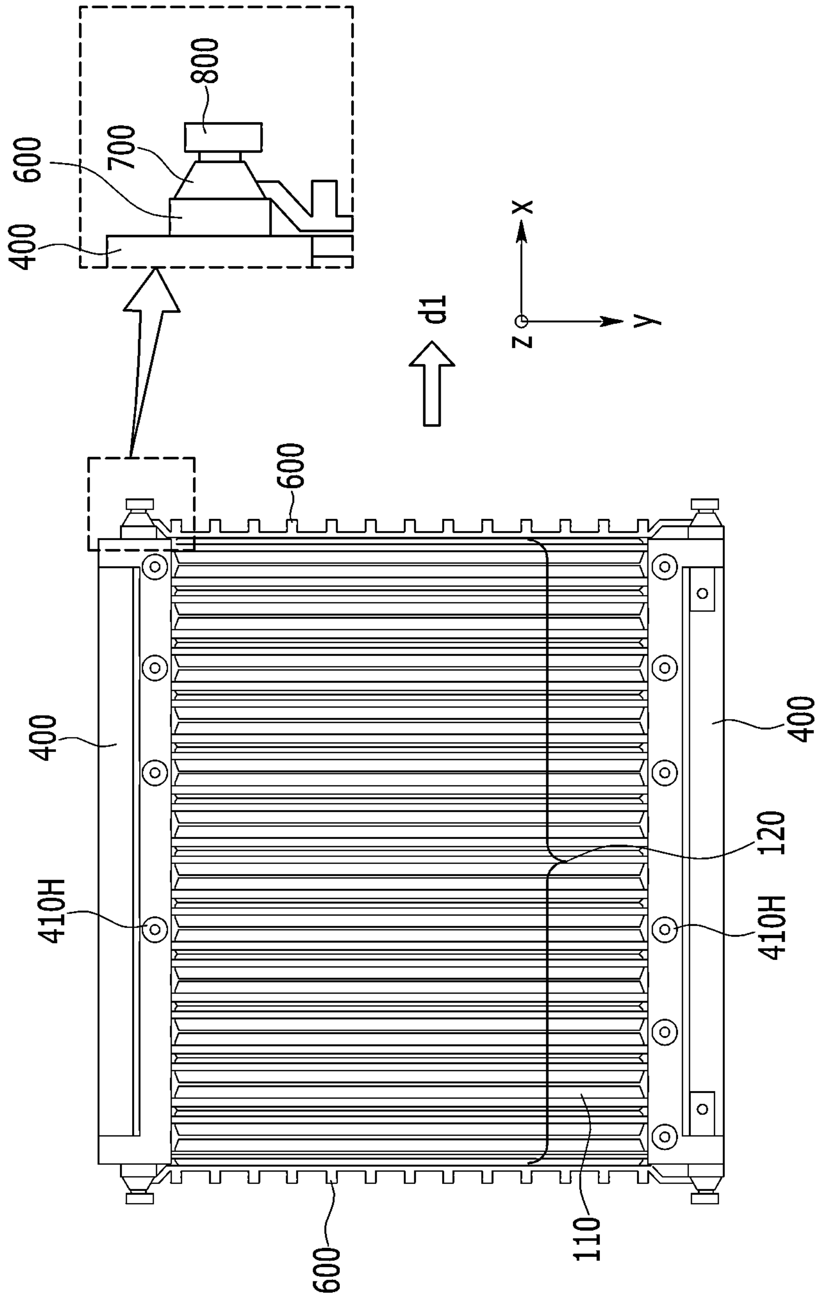

【FIG. 6】
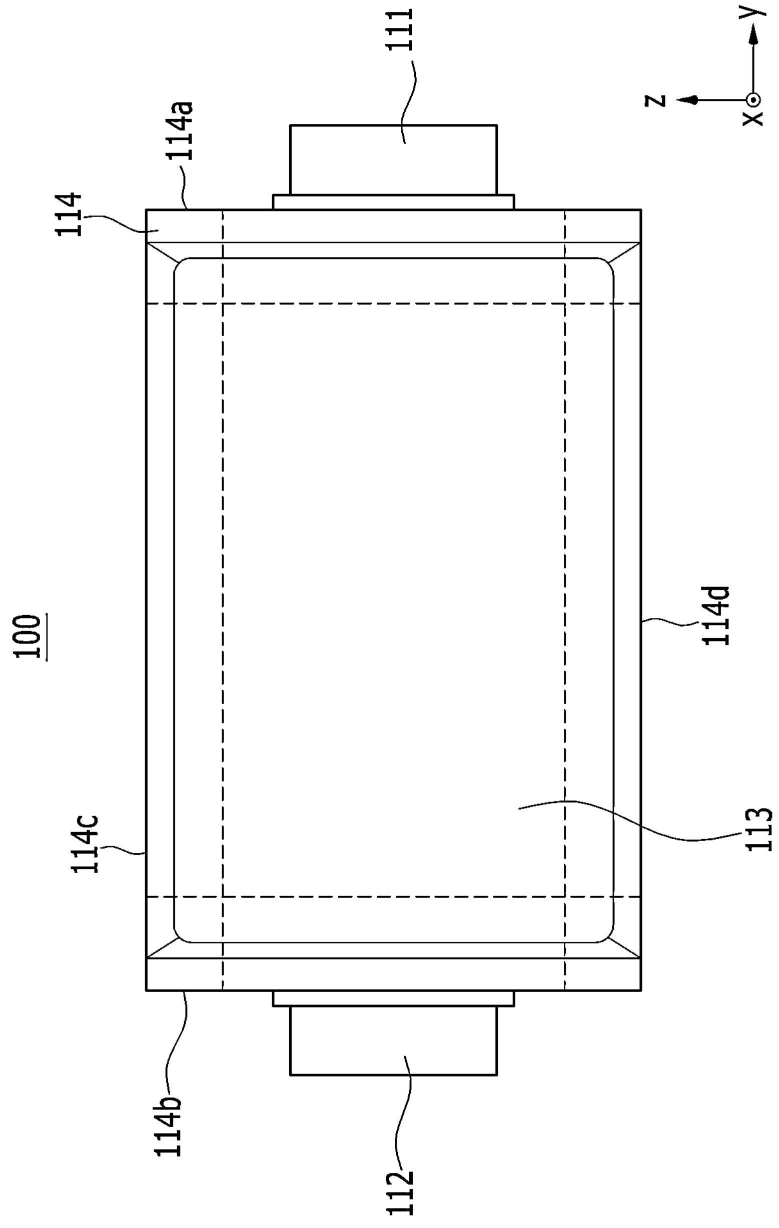

【FIG. 7】
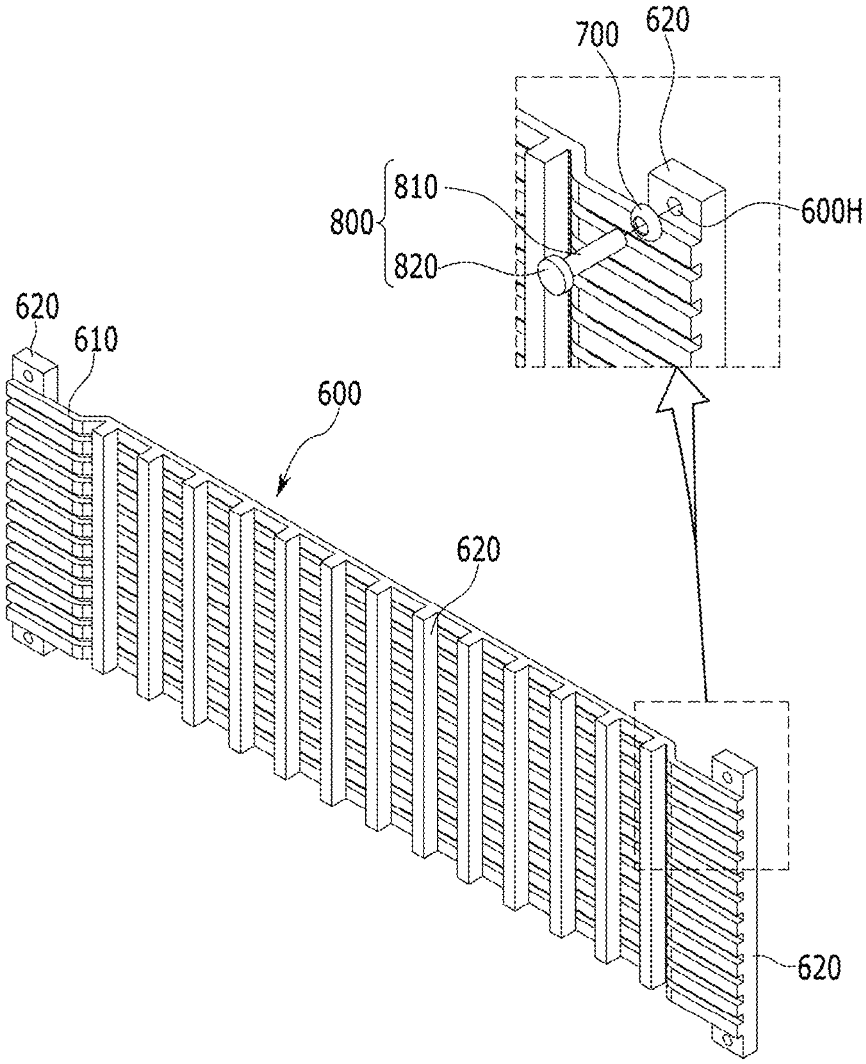

【FIG. 8】
600
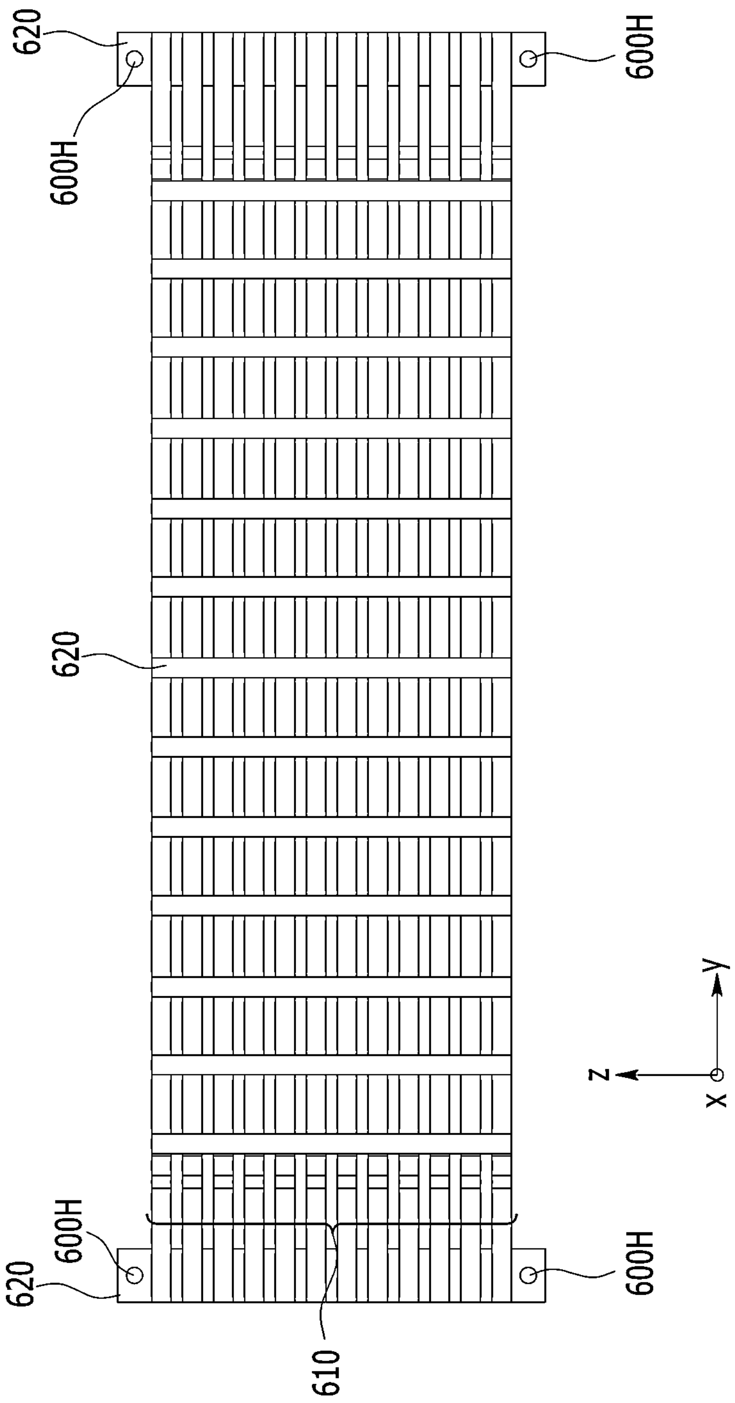

【FIG. 9】
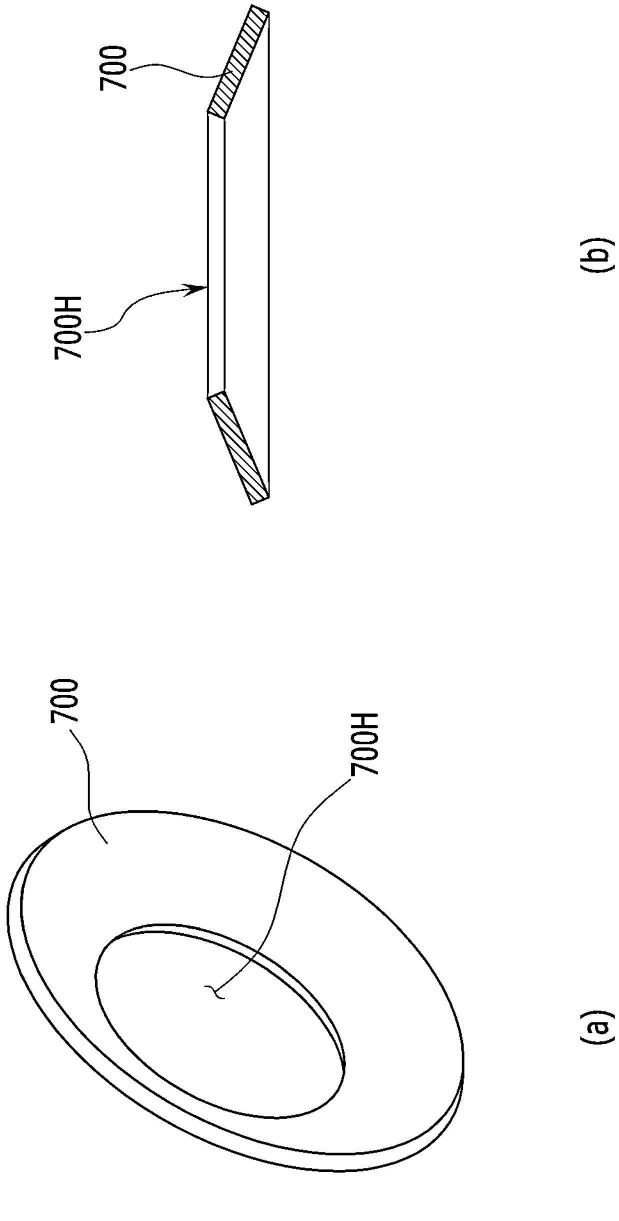

【FIG. 10】
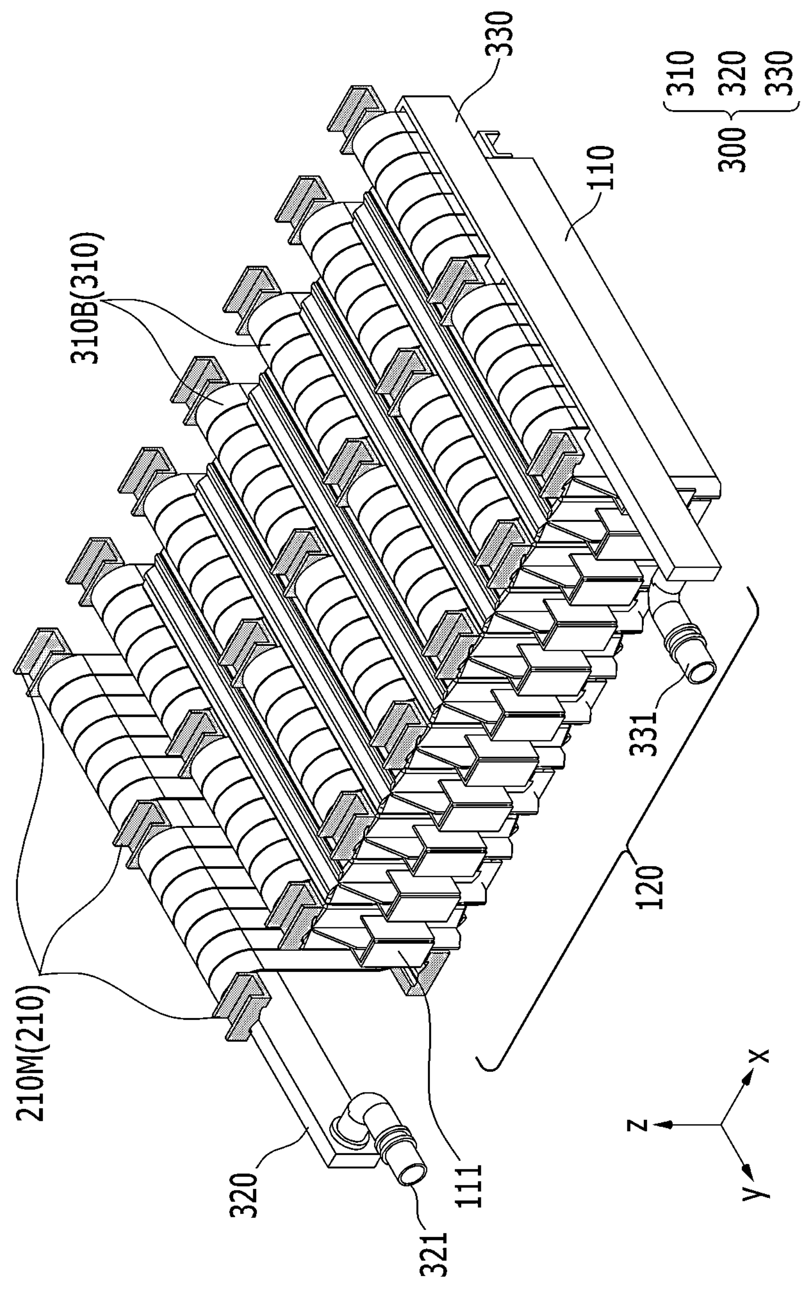

【FIG. 11】
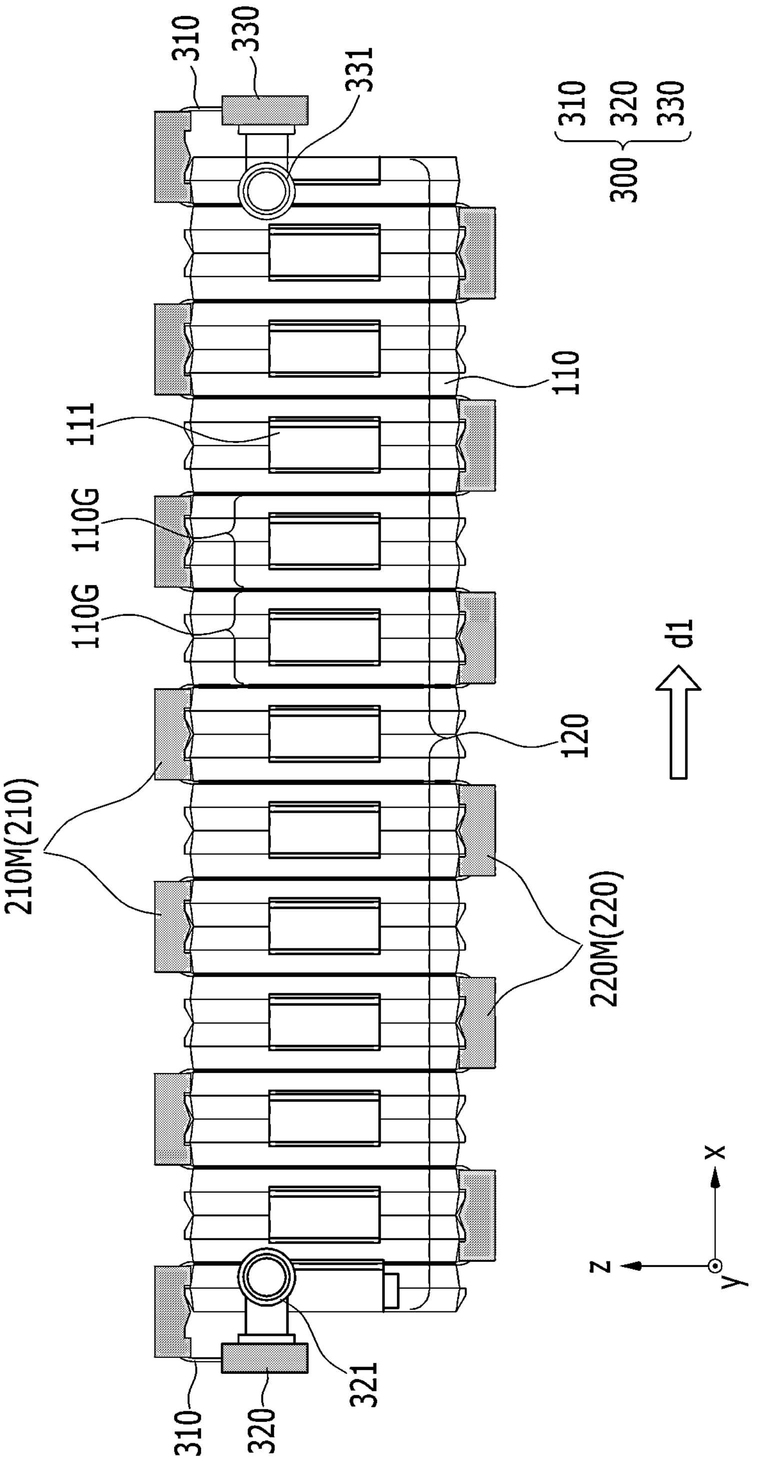

【FIG. 12】
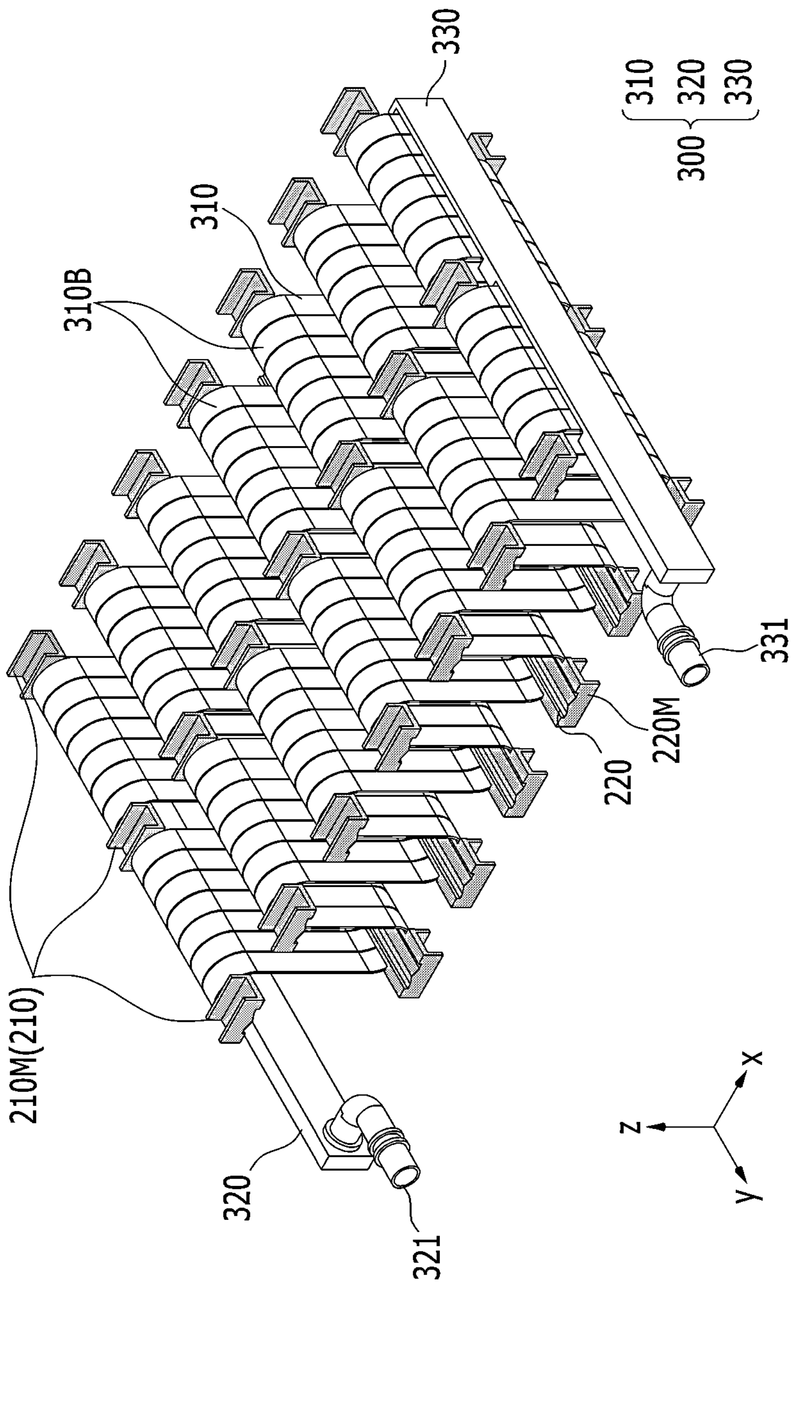

【FIG. 13】
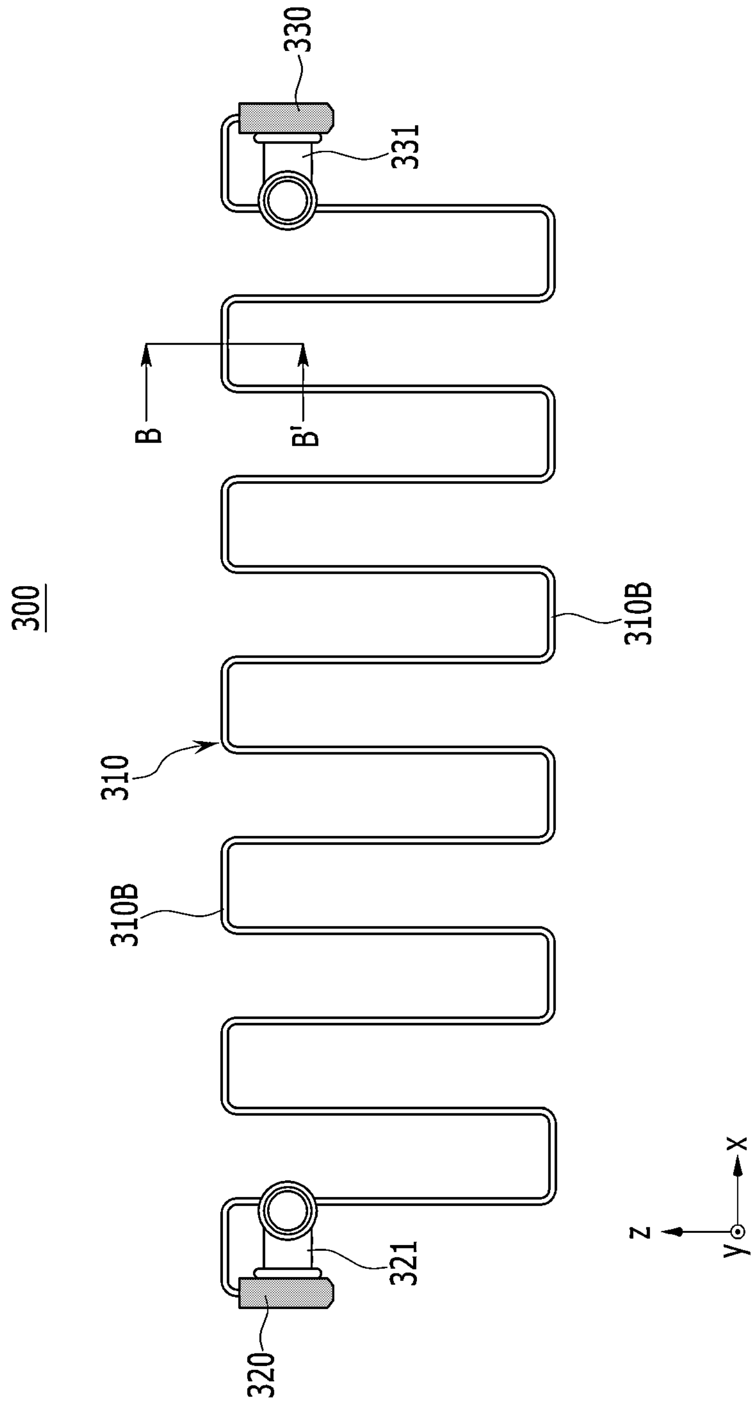

【FIG. 14】
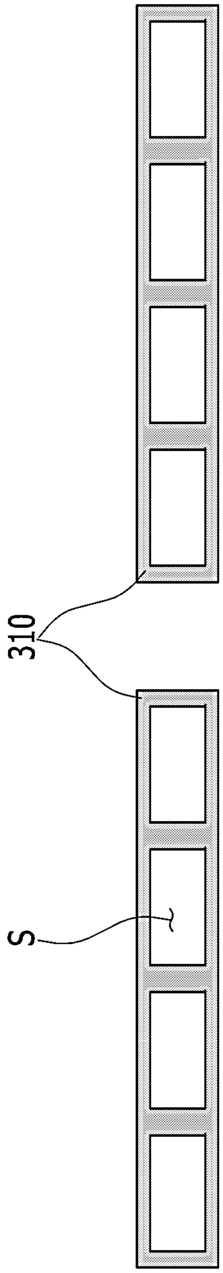

【FIG. 15】
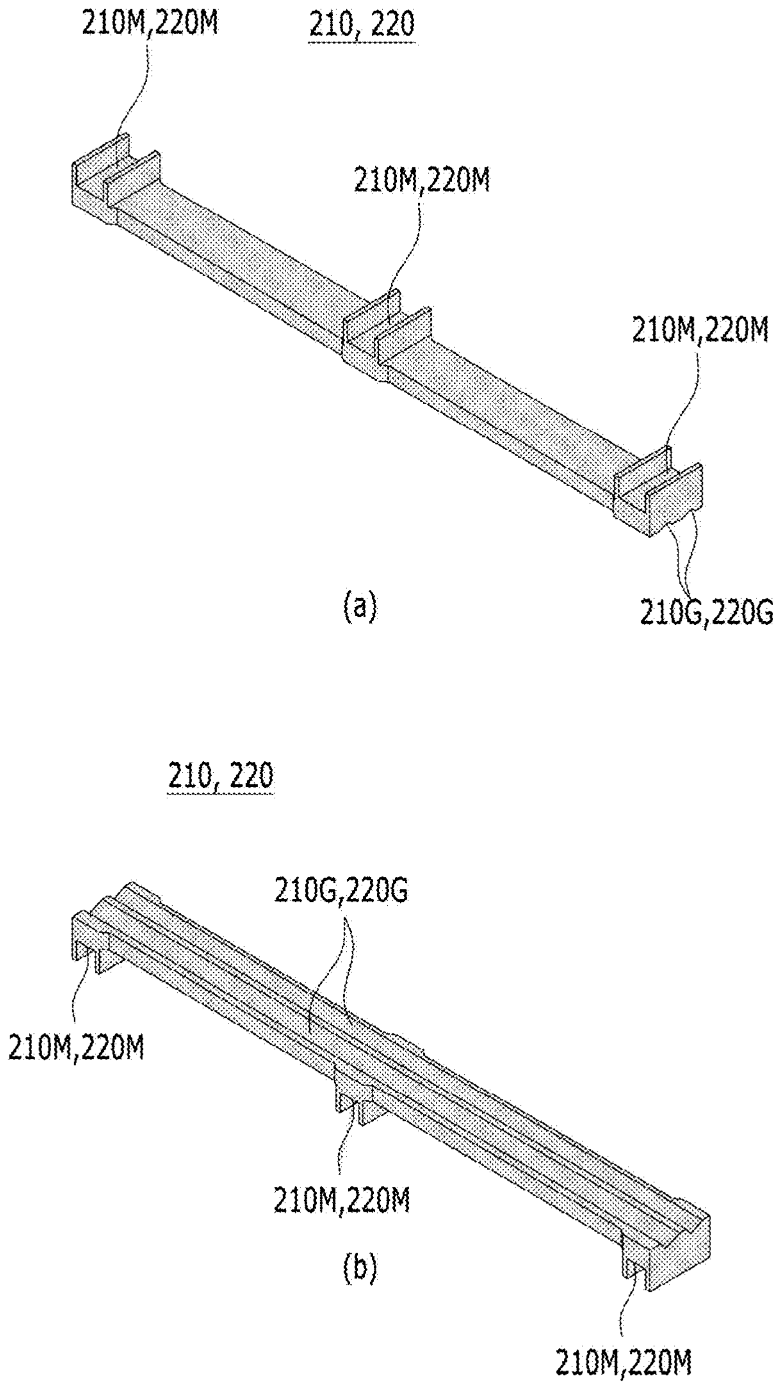

【FIG. 16】
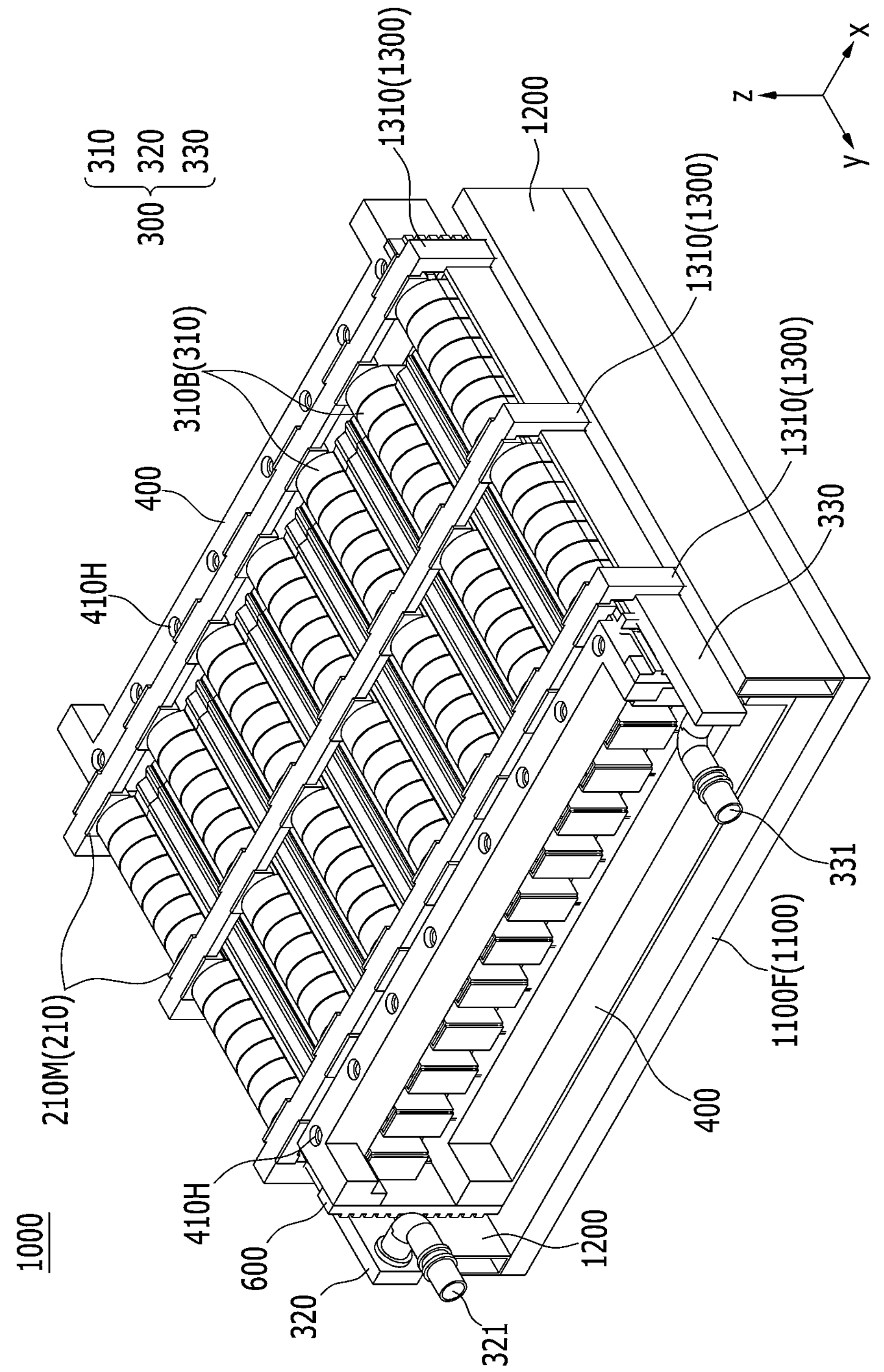

【FIG. 17】
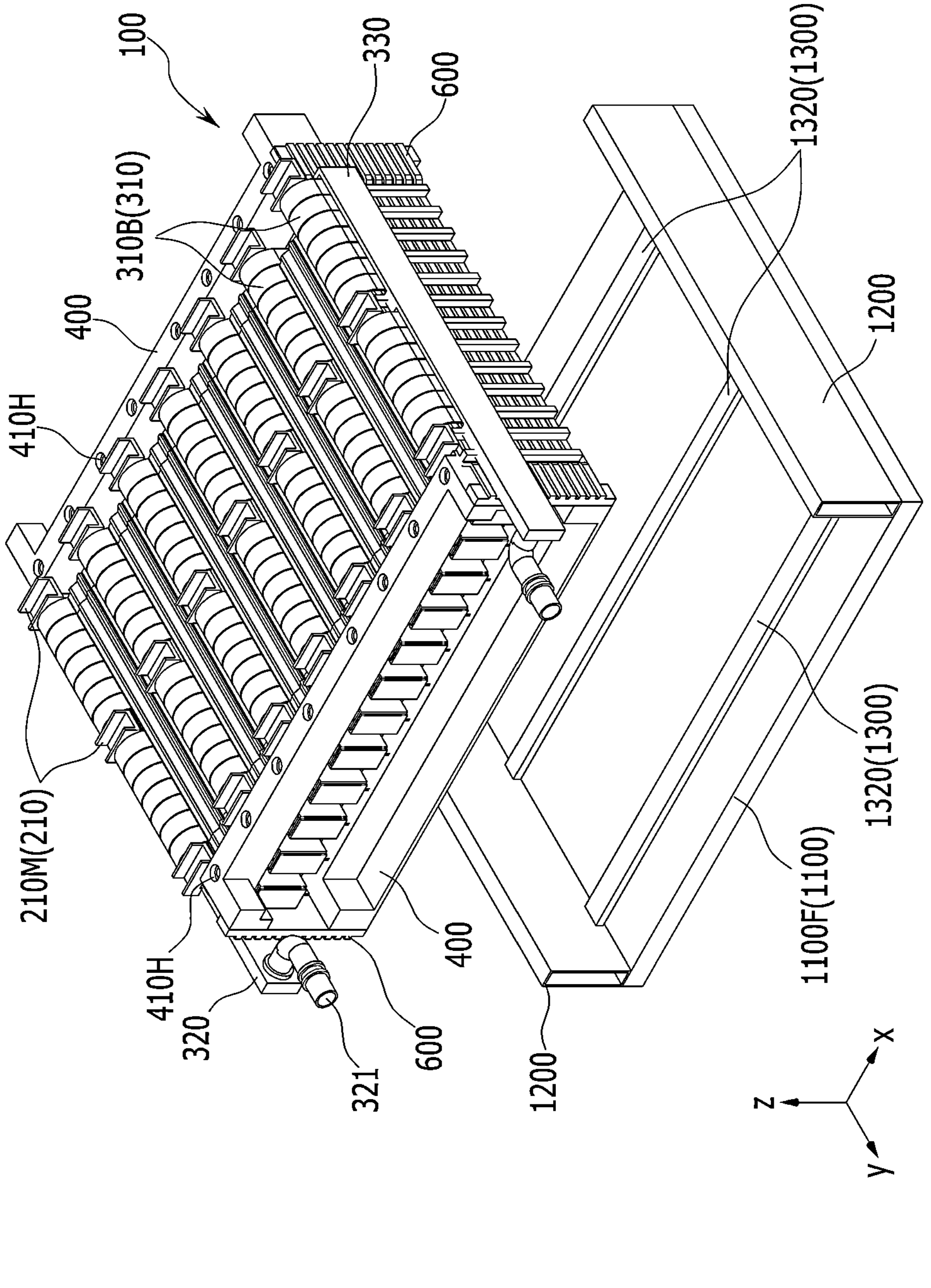

【FIG. 18】
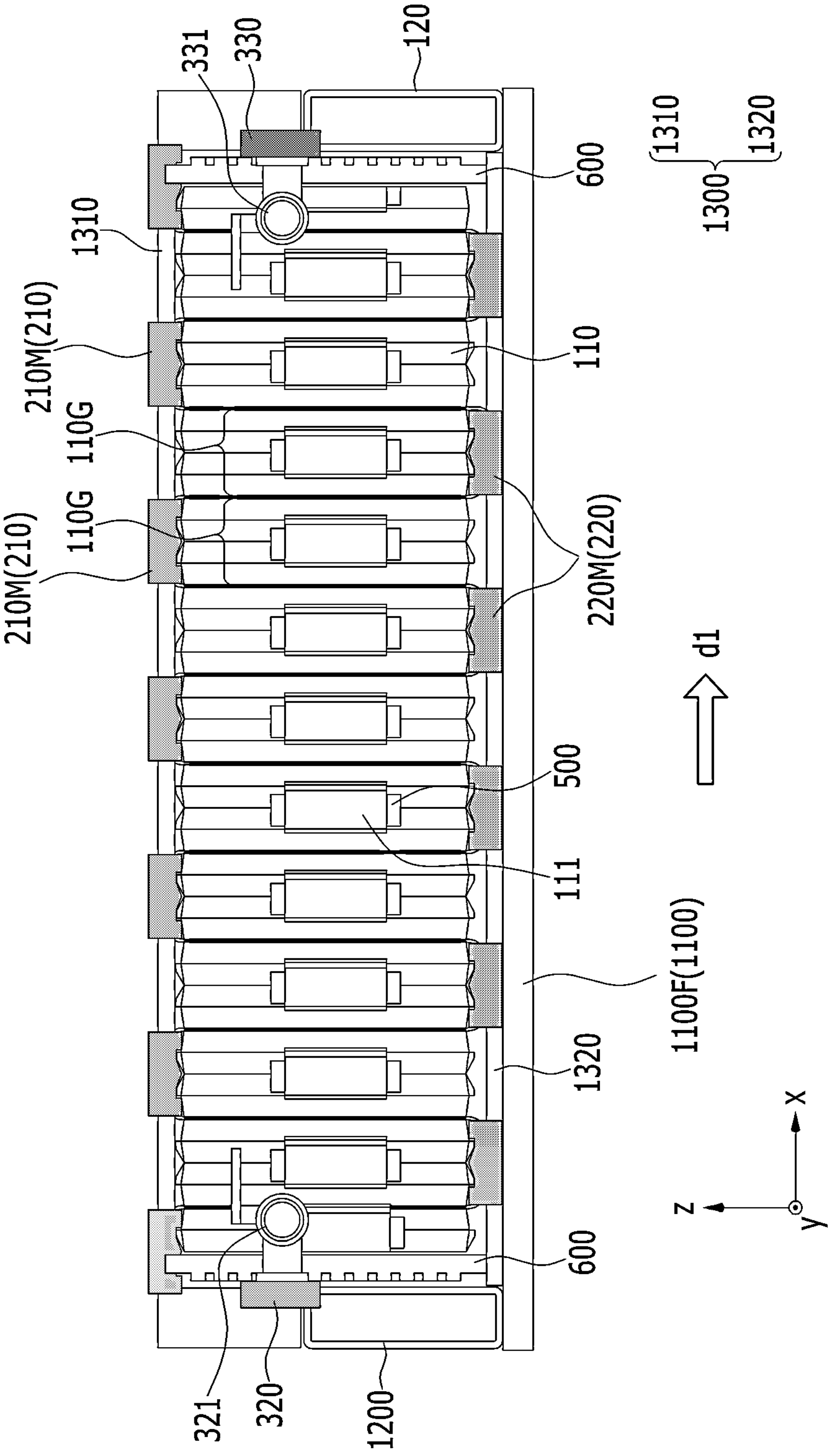

BATTERY MODULE AND BATTERY PACK INCLUDING THE SAME

CROSS CITATION WITH RELATED APPLICATION(S)

This application claims the benefit of Korean Patent Application No. 10-2022-0003810 filed on Jan. 11, 2022 with the Korean Intellectual Property Office, the entire contents of which are incorporated herein by reference.

TECHNICAL FIELD

The present disclosure relates to a battery module and a battery pack including the same, and more particularly, to a battery module having a water-cooled type cooling structure and a battery pack including the same

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, the demand for development of the secondary battery is growing.

Generally, the lithium secondary battery may be classified into a can-type secondary battery in which the electrode assembly is mounted in a metal can, and a pouch-type secondary battery in which the electrode assembly is mounted in a pouch of an aluminum laminate sheet, depending on the shape of the exterior material.

In the case of a secondary battery used for small-sized devices, two to three battery cells are arranged, but in the case of a secondary battery used for a medium- and large-sized device such as automobiles, a battery module in which a large number of battery cells are electrically connected is used. In such a battery module, a large number of battery cells are connected to each other in series or parallel to form a cell assembly, thereby improving capacity and output. Further, one or more battery modules can be mounted together with various control and protection systems such as a BDU (battery disconnect unit), a BMS (battery management system) and a cooling system to form a battery pack.

When a secondary battery is heated over a proper temperature, the performance of the secondary battery may deteriorate, and in the worst case, there is also a risk of an explosion or ignition. In particular, a plurality of secondary batteries, that is, a battery module or a battery pack having battery cells can accumulate the heat emitted from the plurality of battery cells in a narrow space, which may raise the temperature of the battery module quickly and severely. In other words, a battery module including a large number of battery cells, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, if a battery module is included in a battery pack for a vehicle1, the battery module may be frequently exposed to direct sunlight and may be placed under high-temperature conditions, for example, in summer or in a desert. Therefore, when configuring a battery module or a battery pack, it may be very important to ensure stable and effective cooling performance. Cooling methods of battery modules or battery packs can be largely classified into a water cooling method using a coolant such as cooling water and an air cooling method using cooling wind. Among them, water-cooled type cooling has excellent cooling performance and can effectively cool high heat generated from large-capacity battery modules or battery packs.

FIG. 1 is a perspective view of a conventional battery module, and FIG. 2 is a cross-sectional view showing a cross section taken along the cutting line A-A' of FIG. 1. However, FIG. 2 further shows a heat sink 30 arranged under the battery module 10 for convenience of explanation.

Referring to FIGS. 1 and 2, the conventional battery module 10 includes a battery cell stack 12 in which a plurality of battery cells 11 are stacked and a module frame 20 that houses the battery cell stack 12. At this time, the battery cell 11 is a pouch-type battery cell, and the pouch-type battery cell forms a rectangular sheet structure.

Since a plurality of battery cells 11 are stacked, the battery module 10 generates a large amount of heat in a charge and discharge process. The battery module 10 including the pouch-type battery cell was cooled by indirectly or directly contacting the edge of the battery cells 11 with a heat sink 30 having a fixed position and size.

Specifically, the battery module 10 may include a thermal resin layer 40 located between the battery cell stack 12 and the bottom part of the module frame 20. Further, when the battery module 10 is mounted on the pack frame to form a battery pack, the heat transfer member 50 and the heat sink 30 may be sequentially located under the battery module 10. The heat transfer member 50 may be a heat dissipation pad, and the heat sink 30 may form a cooling flow path 31 through which a coolant such as cooling water flows. Edges of the battery cells 11 stacked along one direction are in contact with the thermal resin layer 40, and heat generated from the battery cell 11 may be transferred to the outside of the battery module 10 through the thermal resin layer 40, the bottom part of the module frame 20, the heat transfer member 50, and the heat sink 30 in order. That is, the conventional battery module 10 adopts a water-cooled type structure in which heat is discharged through the edges of the battery cells 11.

Such a water-cooled type structure utilizing the edge of the battery cells 11 has a relatively simplified structure, but causes deterioration of cooling performance, and there is a risk of cracks occurring in the pouch case or the like of the battery cell 11 when high swelling of the battery cell 11 occurs.

Specifically, the battery cells 110 may cause a phenomenon in which the internal electrolyte decomposes to generate gas and the battery cell 110 swells in the process of repeated charging and discharging or in the initial charging process, that is, a swelling or breathing phenomenon.

As the capacity of the battery cell increases, the degree of swelling also increases greatly, and the number of battery cells applied to the battery module tends to increase gradually. Therefore, controlling the swelling of battery cells inside battery modules has become an important issue.

At this time, referring to FIG. 2 again, generally, the thermal resin layer 40 has an adhesive property to fix the battery cells 11. Thus, when swelling of the battery cell 11 occurs, high stress occurs at the edge of the battery cell 11, which may lead to cracking in the pouch case of the battery cell 11. In particular, the more battery cells 11 located an outer position in the battery cell stack 12, the greater the stress due to swelling, which results in a high risk of cracking.

In order to realize high-capacity battery modules and battery packs in the future, Pure Si cells, all-solid-state batteries, and high-SiO-content cells can be applied as pouch battery cells. For such battery cells, the degree of swelling is greater.

When the conventional water cooling method utilizing the edge part is applied to a battery module including battery cells having a high degree of swelling, there is a high risk of cracks occurring in the battery cell, and excessive stress acts on the battery module, which can impair the structural safety of the battery module.

Accordingly, there is a demand for a battery module having a novel cooling structure that can minimize structural damages generated in the battery cell even if they include battery cells exhibiting high swelling characteristics.

DETAILED DESCRIPTION OF THE INVENTION

Technical Problem

It is an object of the present disclosure to provide a battery module that can minimize structural damages generated in the battery cell even if they include battery cells exhibiting high swelling characteristics, and a battery pack including the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery module including: a battery cell stack including a plurality of battery cells arranged along a first direction; side plates covering each of opposite side surfaces of the battery cell stack along the first direction, respectively; a busbar frame covering one surface of the battery cell stack in a direction in which electrode leads of the plurality of battery cells protrude; and a disc spring part located on an outside of a side plate of the side plates, wherein the disc spring part is compressed in a direction parallel to the first direction.

The battery module may further include a fixing member that sequentially passes through the disc spring part and the side plate along a direction parallel to the first direction and couples to the busbar frame.

The fixing member may include a fastening part formed with a screw thread, and a head part having a larger diameter than the fastening part. The fastening part sequentially may pass through the disc spring part and the side plate, and be coupled to the busbar frame, and the disc spring part may be located between the side plate and the head part.

The electrode leads of the plurality of battery cells may protrude in a direction perpendicular to the first direction with respect to the battery cell stack, pass through lead slits formed in the busbar frame, and then be bent and joined to a busbar mounted on the busbar frame.

The side plate may be in a form of a leaf spring that is recessed in a direction in which the battery cell stack is located.

The side plate may have a form in which a plurality of leaf spring members are arranged at intervals along a height direction of the side plate.

Battery cell groups including at least one battery cell of the plurality of battery cells may be arranged along the first direction to form the battery cell stack. Each of the battery cell groups may include a first cell frame located on an upper part of the at least one battery cell, or a second cell frame located on a lower part of the at least one battery cell of the plurality of battery cells.

The battery module may further include a heat sink that contains a cooling tube in which a coolant flows inside, wherein the cooling tube may include bent parts in a bent form. Any one of the bent parts surrounds opposite side surfaces of any one of the battery cell groups and the first cell frame, another one of the bent parts surrounds the opposite side surfaces of another of the battery cell groups and the second cell frame, and the cooling tubes may continue in a zigzag shape.

Each of the first cell frame and the second cell frame may include a housing groove in which the at least one battery cell is seated, and a bracket mounting part formed on a surface opposite to a surface on which the housing groove is formed. A bracket that continues along the first direction may be mounted on the bracket mounting part.

When the at least one battery cell expands, the bracket mounting part may move along the bracket.

According to one embodiment of the present disclosure, there is provided a battery pack including: the battery module; a pack housing that houses the battery module; and a pair of vertical beams that are arranged on a bottom part of the pack housing so as to be perpendicular to one surface of the bottom part of the pack housing, wherein the battery module is arranged between the pair of vertical beams.

The busbar frame may be bolted and assembled to the pack housing.

Battery cell groups including at least one battery cell of the plurality of battery cells may be arranged along the first direction to form the battery cell stack. Each of the battery cell groups may include a first cell frame located on an upper part of the at least one battery cell, or a second cell frame located on a lower part of the at least one battery cell of the plurality of battery cells.

Each of the first cell frame and the second cell frame may include a housing groove in which the at least one battery cell is seated, and a bracket mounting part formed on a surface opposite to a surface on which the housing groove is formed. A bracket that continues along the first direction may be mounted on the bracket mounting part.

The bracket may include an upper bracket that is mounted on the bracket mounting part of the first cell frame, and the upper bracket may be assembled to the pair of vertical beams.

The bracket may include a lower bracket that is mounted on the bracket mounting part of the second cell frame, and the lower bracket may be attached to the bottom part of the pack housing.

When the at least one battery cell expands, the bracket mounting part may move along the bracket.

Advantageous Effects

According to the embodiments of the present disclosure, when swelling of the battery cell occurs, a moving cooling structure and a frame structure that can move fluidly according to the degree of swelling can be realized, thereby minimizing damages generated in the battery cell during the swelling process.

In addition, surface cooling rather than edge cooling can be applied to further improve the cooling performance of the battery cells.

The effects of the present disclosure are not limited to the effects mentioned above and additional other effects not mentioned above will be clearly understood from the description of the appended claims by those skilled in the art.

BRIEF DESCRIPTION OF THE DRAWINGS

FIG. 1 is a perspective view of a conventional battery module;

FIG. 2 is a cross-sectional view showing a cross section taken along the cutting line A-A' of FIG. 1;

FIG. 3 is a perspective view showing a battery module according to one embodiment of the present disclosure;

FIG. 4 is a front view of the battery module of FIG. 3;

FIG. 5 is a plan view of the battery module of FIG. 3 showing elements except for a first cell frame and a heat sink;

FIG. 6 is a plan view showing one of the battery cells included in the battery module of FIGS. 3 to 5;

FIGS. 7 and 8 are a perspective view and a front view showing side plates included in the battery module of FIG. 3;

FIG. 9 provides views (a) and (b), which are diagrams showing a disc spring part included in the battery module of FIG. 3;

FIG. 10 is a perspective view of the battery module of FIG. 3 showing elements except for a busbar frame and a side plate;

FIG. 11 is a front view of the battery module of FIG. 10;

FIG. 12 is a perspective view showing a first cell frame, a second cell frame, and a heat sink according to one embodiment of the present disclosure;

FIG. 13 is a front view showing a heat sink according to one embodiment of the present disclosure;

FIG. 14 is a cross-sectional view showing a cross section taken along the cutting line B-B' of FIG. 13;

FIG. 15 provides views (a) and (b), which are perspective views showing a first cell frame or a second cell frame according to one embodiment of the present disclosure;

FIG. 16 is a perspective view showing another battery pack according to one embodiment of the present disclosure;

FIG. 17 is an exploded perspective view showing a state in which a battery module and a pack housing included in the battery pack of FIG. 16 are separated; and FIG. 18 is a front view of the battery pack of FIG. 16.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of a part and an area are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means arranged on or below a reference portion, and does not necessarily mean being arranged on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when it is referred to as "planar", it means when a target portion is viewed from the upper side, and when it is referred to as "cross-sectional", it means when a target portion is viewed from the side of a cross section cut vertically.

FIG. 3 is a perspective view showing a battery module 100 according to one embodiment of the present disclosure. FIG. 4 is a front view of the battery module 100 of FIG. 3. Specifically, FIG. 4 is a front view of the battery module 100 of FIG. 3 as viewed along the −y axis direction on the xz plane.

FIG. 5 is a plan view of the battery module 100 of FIG. 3 showing elements except for a first cell frame 210 and a heat sink 300. Specifically, FIG. 5 is a plan view of the battery module 100 of FIG. 3 from which a first cell frame 210 and a heat sink 300 are removed, as viewed along the −z axis direction on the xy plane.

FIG. 6 is a plan view showing one of the battery cells included in the battery module of FIGS. 3 to 5.

Referring to FIGS. 3 to 6, a battery module 100 according to one embodiment of the present disclosure includes a battery cell stack 120 including a plurality of battery cells 110 arranged along a first direction d1; side plates 600 covering each of both side surfaces of the battery cell stack 120 along the first direction d1; a busbar frame 400 covering one surface of the battery cell stack 120 in a direction in which the electrode leads 111 and 112 of the battery cells 110 protrude; and a disc spring part 700 located on the outside of the side plate 600. The disc spring part 700 is compressed in a direction parallel to the first direction d1.

First, the battery cell 110 according to the present embodiment may be a pouch-type battery cell. Such a pouch-type battery cell may be formed by housing an electrode assembly in a pouch case of a laminated sheet containing a resin layer and a metal layer, and then joining the outer peripheral part of the pouch case. Such a battery cell 110 may be formed in a rectangular sheet-like structure as shown in FIGS. 5 and 6. Specifically, the battery cell 110 according to the present embodiment has a structure in which two electrode leads 111 and 112 face each other and protrude from one end 114*a* and the other end 114*b* of the battery body 113, respectively. The battery cell 110 can be produced by joining both ends 114*a* and 114*b* of a battery case 114 and one side part 114*c* connecting them in a state in which an electrode assembly (not shown) is housed in a battery case 114. In other words, the battery cell 110 according to the present embodiment has a total of three sealing parts, the sealing parts have a structure that is sealed by a method such as fusion, and the remaining other side part 114*d* may be formed of a folded portion of the battery case 114.

However, the battery cell 110 described above is an illustrative structure, and it goes without saying that a unidirectional battery cell in which the two electrode leads protrude in the same direction is available.

Such a battery cells 110 are stacked in the first direction d1 to form the battery cell stack 120. The stacked first direction (d1) is a direction perpendicular to one surface of the battery body 113 of the battery cells 110, and corresponds to a direction parallel to the x-axis direction in this specification.

FIGS. 7 and 8 are a perspective view and a front view showing side plates included in the battery module of FIG. 3.

Referring to FIGS. 7 and 8 together with FIGS. 3 to 5, two side plates 600 may be arranged so as to cover each of both side surfaces of the battery cell stack 120 along the first direction d1 as described above. The side plate 600 may be in the form of a leaf spring that is recessed in a direction in which the battery cell stack 120 is located.

More specifically, as shown in FIG. 3, the central part of the side plate 600 may be recessed so as to be bent toward the place where the battery cell stack 120 is located, rather than the both end parts of the side plate 600 along the direction (y-axis direction or −y-axis direction) parallel to the direction in which the electrode leads 111 of the battery cells 110 protrude. Accordingly, even if high pressure acts in the direction of each side plate 600 in the battery cell stack 120 due to swelling of the battery cells 110, the side plate 600 exhibiting elastic property can control the swelling of the battery cell 110 while absorbing the swelling of the battery cell stack 120.

That is, the side plate 600 according to the present embodiment has a leaf spring shape, thereby not only functioning as a frame for housing the battery cell stack 120, but also being able to control swelling of the battery cells 110, and function as an elastic component that allows the displacement movement of the battery cell.

Moreover, the side plate 600 according to the present embodiment may have a configuration in which a plurality of leaf spring members 610 are arranged at intervals along the height direction, as shown in FIGS. 7 and 8. The individual leaf spring members 610 whose central portions are curved at the place where the battery cell stacks 120 are arranged can be arranged while being spaced apart at regular intervals along the height direction. Here, the height direction is a direction perpendicular to both the first direction d1, which is the stacking direction of the battery cells 110, and the direction in which the electrode leads 111 and 112 protrude, and means a direction parallel to the z-axis direction.

In addition, the side plate 600 may further include a connection part 620 that connects each leaf spring member 610 so that each leaf spring member 610 can be maintained at a regular interval. The number and positions of the connection parts 620 are not particularly limited, but it is preferable to be located at both ends of the side plate 600, respectively. In some cases, as shown in FIGS. 7 and 8, a plurality of connection parts 620 may be located at regular intervals even in the region between the both ends.

As described above, the side plate 600 is not configured in the form of a single leaf spring, but is configured to include individual leaf spring members 610 whose parts are separated from each other, thereby capable of individually responding according to the swelling characteristics of each position of the battery cell 110. That is, the present embodiment in which the individual leaf spring members 610 are separated has an advantage of exhibiting a flexible elastic property against swelling of the battery cell 110 as compared to a completely integrated structure.

Below, the material of the side plate 600 according to the present embodiment will be described in detail. The side plate 600 according to the present embodiment may include a composite material, and the composite material may be Fiber Reinforced Plastic (FRP) or Carbon Fiber Reinforced Plastic (CFRP). The fiber-reinforced plastic or carbon fiber-reinforced plastic is a plastic-based composite material reinforced with glass fiber and carbon fiber, respectively, and is a material with excellent mechanical properties and corrosion resistance.

When a metal material is applied to the side plate 600, there is a problem that the amount of displacement capable of absorbing swelling of the battery cell 110 is small due to its low tensile modulus. Even if the battery cell stack 120 is slightly displaced due to the swelling of the battery cell 110, a large stress is generated in the bent part in the form of the leaf spring. In the case of battery cells with high degree of swelling, such as pure Si cells, all-solid-state batteries, and high-SiO-content cells, since the degree of swelling is large, the amount of displacement that should be absorbed by the battery module is also large. Therefore, a frame using a metal material in a battery module to which these battery cells are applied has a limit in absorbing swelling.

On the other hand, in the case of fiber-reinforced plastics or carbon fiber-reinforced plastics, since they have a tensile strength equal to or greater than that of metal, but have a lower Young's modulus than metal, they can exhibit elastic property capable of effectively absorbing swelling while having high rigidity against swelling of battery cells. In the case of a pure Si cell or an all-solid-state battery, a maximum pressure of 3 to 8 MPa is generated at EOL (End Of Life), but a composite material of fiber-reinforced plastic or carbon fiber-reinforced plastic can exhibit elastic property even at such a high pressure, and is suitable for application to the side plate 600 according to the present embodiment.

Further, since fiber-reinforced plastics or carbon fiber-reinforced plastics are produced by laminating glass fibers or carbon fibers and then curing a resin around them, they have the advantage of being able to set strengths and elastic moduli that are different for each direction.

However, composite materials of existing fiber-reinforced plastics or carbon fiber-reinforced plastics have been developed with a focus on lightweight and high-strength characteristics, and have the problem of being brittle and relatively expensive. Therefore, the composite material according to the present embodiment attempts to solve the above problems by changing the material of the resin and including a sheet material in addition to the fiber material.

Composite materials of fiber-reinforced plastics or carbon fiber-reinforced plastics are produced by laminating glass fibers or carbon fibers and then curing resin around them, but a composite material according to the present embodiment may include a fibrous material, a resin and a sheet material interposed between the fibrous materials. The fiber material according to the present embodiment may include glass fibers or carbon fibers. The resin to be cured may include at least one of epoxy or urethane, and the sheet material may include at least one of PET (polyethylene terephthalate) and PU (polyurethane).

More specifically, the resin may include urethane. An attempt was made to improve the brittleness of composite materials by applying urethane having soft properties as a resin material. In addition, an attempt was made to reinforce the soft characteristics of the composite material, reduce the amount of expensive fiber materials used, and reduce costs by interposing a soft sheet material between the fiber materials.

Referring to FIGS. 3 to 5 again, as described above, the busbar frame 400 covering one surface of the battery cell stack 120 in the direction in which the electrode leads 111 of the battery cells 110 protrude may be arranged. More specifically, two busbar frames 400 may be arranged so as to cover one surface and the other surface of the battery cell stack 120 in a direction in which the electrode leads 111 and 112 of the battery cells 110 protrude.

The busbar 500 may be mounted on the busbar frame 400. Specifically, the electrode leads 111 and 112 of the battery cell 110 may protrude in a direction perpendicular to the first direction d1 with respect to the battery cell stack 120, pass through lead slits formed on the busbar frame 400, and then be bent and connected to the busbar 500. More specifically, one electrode lead 111 may pass through lead slits of the busbar frame 400 covering the one surface of the battery cell stack 120, and then be connected to the busbar 500, and the other electrode lead 112 may pass through a lead slit of another busbar frame 400 covering the other surface of the battery cell stack 120, and then be connected to the busbar 500. A connection method between the electrode leads 111 and 112 and the busbar 500 is not particularly limited, but weld junction may be performed as an example.

In the same manner as described above, the battery cells 110 constituting the battery cell stack 120 may be electrically connected to each other in series or parallel.

The busbar frame 400 preferably includes an electrically insulating material in order to prevent short circuiting due to contact with the battery cells 110 and the like.

Meanwhile, although not specifically shown in the figure, the busbar frame 400 can be mounted with a terminal busbar for external power connection of the battery module 100 and a module connector for transmitting voltage and temperature sensing information.

Next, the disc spring part according to the present embodiment will be described in detail.

FIG. 9 provides views (a) and (b), which are diagrams showing a disc spring part included in the battery module of FIGS. 3 to 5. (a) of FIG. 9 is a perspective view of the disc spring part, and (b) of FIG. 9 is a cross-sectional view of the disc spring part.

Referring to FIG. 9, (a) and (b) together with FIGS. 3, 4, 5 and 7, the disc spring part 700 is located on the outside of the side plate 600 as described above. Being located on the outside herein means that the disc spring part 700 is located on the opposite side of the side plate 600 facing the battery cell stack 120.

Further, the disc spring part 700 is compressed in a direction parallel to the first direction d1, which is the arrangement direction of the battery cells 110. That is, when swelling of the battery cells 110 occurs, they swell mainly along the first direction d1, which is the arrangement direction of the battery cells 110, and the disc spring part 700 may allow displacement movement of the battery cells 110 while being compressed along the first direction d1.

Specifically, the battery module 100 according to the present embodiment may further comprise a fixing member 800 that sequentially passes through the disc spring part 700 and the side plate 600 along a direction parallel to the first direction d1 and couples to the busbar frame 400.

In the case of the disc spring part 700, it may be a member in which a central hole 700H is formed at the center of an elastic body having an oblique inclination. A through hole 600H may be formed in a portion of the side plate 600 corresponding to an area where the disc spring part 700 is located.

The fixing member 800 may sequentially pass through the center hole 700H of the disc spring part 700 and the through hole 600H of the side plate 600 and couple to the busbar frame 400.

The fixing member 800 is a bolt-shaped member, and may include a fastening part 810 formed with a screw thread, and a head part 820 having a larger diameter than the fastening part 810. Further, the diameter of the head part 820 may be larger than the inner diameter of the central hole 700H of the disc spring part 700 and the inner diameter of the through hole 600H of the side plate 600.

The fastening part 810 may sequentially pass through the center hole 700H of the disc spring part 700 and the through hole 600H of the side plate 600 and couple to the busbar frame 400. The disc spring part 700 may be located between the side plate 600 and the head part 820 of the fixing member 800. Although not specifically shown in the figure, the busbar frame 400 may be provided with a fastening hole where a screw thread is formed on the inner surface, and the fastening part 810 may be bolted and assembled to this fastening hole.

Through the configuration above, the disc spring part 700 can be compressed along the first direction d1, which is the arrangement direction of the battery cells 110.

In addition to the side plate 600 in the form of a leaf spring described above, the disk spring part 700 can implement a moving structure that allows displacement and movement of the battery cells 110 when swelling of the battery cells 110 occurs.

In the case of the conventional battery module 10, since the edges of the battery cells 11 are joined and fixed to the thermal resin layer 40, high stress is generated at the edges of the battery cells 11 when swelling occur, which may lead to the generation of crack in the pouch case of the battery cell 11.

On the other hand, the battery module 100 according to the present embodiment allows the displacement movement of the battery cells to some extent by the moving structure via the disk spring part 700 when swelling of the battery cells 110 occurs, thereby being able to prevent damage such as cracks from occurring in the battery cells 110.

Next, the battery cell group and the heat sink according to the present embodiment will be described in detail with reference to FIGS. 10 to 15.

FIG. 10 is a perspective view of the battery module of FIG. 3 showing elements except for a busbar frame 400 and a side plate 600. FIG. 11 is a front view of the battery module of FIG. 10. FIG. 12 is a perspective view showing a first cell frame, a second cell frame, and a heat sink according to one embodiment of the present disclosure. In particular, FIG. 12 is a diagram in which the battery cell stack 120 is removed from FIG. 10.

Referring to FIGS. 10 to 12, the battery module 100 according to the present embodiment may include a battery cell group 110G. The battery cell group 110G may include at least one battery cell 110. That is, one battery cell 110 may form a battery cell group 110G, and a plurality of battery cells 110 may form one battery cell group 110G. As an example, FIG. 11 shows that two battery cells 110 are assembled to form a battery cell group 110G.

As will be described later, in this specification, the battery cell group 110G may be a unit that divides an assembly of battery cells 110 that are wrapped around the bent part 310B of the cooling tube 310 while being housed in the first cell frame 210 or the second cell frame 220.

At least one battery cell 110 forms the battery cell group 110G, and such battery cell groups 110G are stacked in the first direction d1 to form the battery cell stack 120.

Each of the battery cell groups 110G includes a first cell frame 210 located on the upper part of at least one battery cell 110 or a second cell frame 220 located on the lower part of at least one battery cell 110.

Specifically, at least one battery cell 110 in the battery cell group 110G may be housed in either the first cell frame 210 or the second cell frame 220. As will be described later, the first cell frame 210 and the second cell frame 220 are formed with housing grooves in which the battery cells 110 are seated, so that the battery cells 110 can be housed therein. The first cell frame 210 and the second cell frame 220 are constituents having the same shape, but there is a difference in the arrangement position with respect to the battery cell 110 in the battery module 100. Detailed structures of the first cell frame and the second cell frame will be described later with reference to FIG. 15.

More specifically, as shown in FIGS. 10 to 12, when any one battery cell 110G includes the first cell frame 210, the battery cell group 110G adjacent thereto includes the second cell frame 220. That is, in the battery cell groups 110G arranged along the first direction d1, the battery cell group 110G including the first cell frame 210 and the battery cell group 110G including the second cell frame 220 may be alternately arranged.

FIG. 13 is a front view showing a heat sink according to one embodiment of the present disclosure. FIG. 14 is a cross-sectional view showing a cross section taken along the cutting line B-B' of FIG. 13.

Referring to FIGS. 10 to 14 together, the battery module 100 according to the present embodiment may further include a heat sink 300.

The heat sink 300 may include a cooling tube 310 through which a coolant flows inside, and the cooling tube 310 may include a bent parts 310B in a bent form. As shown in FIGS. 10 and 11, one of the bent parts 310B surrounds both side surfaces and upper part of any one of the battery cell groups 110G, and the other one of the bent parts 310B may wrap both side surfaces and lower part of the other one of the battery cell groups 110G. More specifically, one of the bent parts 310B surrounds both side surfaces of any one of the battery cell groups 110G and the first cell frame 210, and the cooling tube 310 may continue in a zigzag shape while the other one of the bent parts 310B surrounds both side surfaces of the other one of the battery cell groups 110G and the second cell frame 220.

As described above, the battery cell group 110G including the first cell frame 210 and the battery cell group 110G including the second cell frame 220 may be alternately arranged, wherein one of the bent parts 310B surrounds the battery cell group 110G including the first cell frame 210, and the next bent part 310B surrounds the battery cell group 110G including the second cell frame 220, so that the cooling tube 310 as a whole may continue in a zigzag shape.

The heat sink 300 according to the present embodiment may include an inflow manifold 320 connected to one end of cooling tube 310 and a discharge manifold 330 connected to the other end of cooling tube 310. The inflow manifold 320 may be formed with an inflow part 321 into which the coolant flows, and the discharge manifold 330 may be formed with a discharge part 331 through which coolant is discharged. The shape of the inflow part 321 and the discharge part 331 is not particularly limited and may be a tubular shape or an opening hole shape. In FIGS. 10, 11, 12, 13, and the like, the tubular inflow part 321 and the discharge part 331 are shown by way of example.

As shown in FIG. 14, at least one space S is formed inside the cooling tube 310, and such a space S may communicate with the inflow part 321 and the discharge part 331. Thus, the coolant that has flowed in through the inflow part 321 flows into the cooling tube 310 via the inflow manifold 320. The coolant flowing along the inner space S of the cooling tube 310 may be finally discharged through the discharge part 331 via the discharge manifold 330. A coolant flows along the periphery of the battery cells 110 and absorbs heat generated from the battery cells 110. The coolant may be cooling water. The battery module 100 according to the present embodiment has a water-cooled type cooling structure.

At this time, the zigzag-shaped cooling tube 310 surrounds and continues the side surfaces of the battery cell groups 110G, that is, one surface of the battery body 113 (see FIG. 6) of the battery cell 110. That is, the cooling tube 310 is in contact with one surface of the battery body 113 of the battery cell 110. While the conventional battery module 10 shown in FIGS. 1 and 2 has an edge cooling structure in which heat is discharged through the edge part of the battery cell 11, whereas the battery module 100 according to the present embodiment has a surface cooling structure in which the cooling tube 310 is in contact with one surface of the battery body 113 of the battery cells 110. Since the entire surface of the battery body 113 of the battery cell 110 can abut on the cooling tube 310 and thus, the cooling area is much wider, it has the advantage of exhibiting excellent cooling performance compared to the conventional battery module 10.

Further, as mentioned above, the battery cells 110 may cause a phenomenon in which the internal electrolyte decomposes to generate gas and the battery cell 110 swells in the process of repeated charging and discharging, that is, a swelling or breathing phenomenon. In the case of the conventional battery module 10, since the edges of the battery cells 11 are adhesively fixed to the thermal resin layer 40, high stress is generated at the edges of the battery cells 11 when swelling occur, which may lead to the generation of crack in the pouch case of the battery cell 11.

On the other hand, in the case of the battery module according to the present embodiment, since the cooling tube 310 of the heat sink 300 for cooling is continued in a zigzag shape and arranged between the battery cells 110, the battery cells 110 are not joined and fixed to specific points. Even if high swelling or breathing occurs in the battery cells 110, the assembly form between the battery cell stack 120 and the heat sink 300 can provide some degree of structural flexibility in the first direction d1, which is the stacking direction of the battery cells 110, thereby being able to prevent the generation of crack in the pouch case of the battery cell 110.

Next, the first cell frame and the second cell frame according to the present embodiment will be described in detail with reference to FIG. 15 and the like.

FIG. 15 provides views (a) and (b), which are perspective views showing a first cell frame or a second cell frame according to one embodiment of the present disclosure. The first cell frame 210 and the second cell frame 220 are distinguished by being located above or below the battery cells. However, since they have the same configuration, the specific structure will be described together.

In FIG. 15, (a) shows the first cell frame 210 or the second cell frame 220 at an angle at which the bracket mounting parts 210M and 220M are seen, and (b) of FIG. 15 shows the first cell frame 210 or the second cell frame 220 at an angle at which the housing grooves 210G and 220G in which the battery cells 110 are seated are seen.

Referring to FIGS. 10, 11, 12 and (a) and (b) of FIG. 15, each of the first cell frame 210 and the second cell frame 220 according to the present embodiment may include housing grooves 210G and 220G in which at least one battery cell 110 is seated. As described above, the first cell frame 210 and the second cell frame 220 may have the same shape, but the difference is that the first cell frame 210 is located on the upper part of the battery cells 110, and the second cell frame 220 is located on the lower part of the battery cells 110. The housing grooves 210G and 220G may be formed on one surface of the first cell frame 210 or the second cell frame 220 facing the at least one battery cell 110.

Within one battery cell group 110G, at least one battery cell 110 is inserted and mounted into the housing groove 210G of the first cell frame 210 or the housing groove 220G of the second cell frame 220. As an example, in (b) of FIG. 15, it is shown that two housing grooves 210G and 220G are formed. That is, two battery cells 110 may be seated on one first cell frame 210 or second cell frame 220. Further, adhesive or double-sided tape is applied between the battery cells 110 and the housing grooves 210G and 220G, so that the battery cells 110 can be fixed to the first cell frame 210 or the second cell frame 220. In addition, one surface of the battery body 113 of the battery cells 110 in the battery cell group 110G may be fixed with an adhesive or double-sided tape. Further, one surface of the battery body 113 of the battery cell 110 and the cooling tube 310 of the heat sink 300 may also be fixed with an adhesive or double-sided tape.

The first cell frame 210 or the second cell frame can protect the side surfaces of the battery cells 110 to prevent the battery cells 110 from being damaged, and also may include an electrically insulating material to insulate and protect the side surfaces of the battery cells 110.

Further, as described above, the battery cells 110 in the battery cell group 110G according to the present embodiment are wrapped by the cooling pipe 310 of the heat sink 300 while being inserted into one of the housing grooves 210G and 220G of either the first cell frame 210 or the second cell frame 220. At this time, the first cell frame 210 or the second cell frame 220 serves to improve the assembly efficiency between the battery cells 110 and the heat sink 300. If there is no first cell frame 210 or second cell frame 220, it is difficult to establish that reference point in arranging the cooling tube 310 having the bent part 310B between the battery cells 110. The battery cell 110 needs to be fixed in a specific position and arrange a heat sink, which is difficult to implement in the absence of the first and second cell frames 210 and 220.

In the present embodiment, after at least one battery cell 110 is inserted into the first cell frame 210 or the second cell frame 220 to form a battery cell group 110G, since the bent part 310B is fixed with the first cell frame 210 or the second cell frame 220 as a reference point, and the cooling pipes 310 are arranged in a zigzag pattern, so that assembly becomes easier.

That is, the first cell frame 210 or the second cell frame 220 according to the present embodiment can easily implement an assembly structure between the battery cells 110 and the cooling tubes 310 continuing in a zigzag shape, and can function as a support structure and a fixed reference point in the unit of cell group 110G.

Meanwhile, each of the first cell frame 210 and the second cell frame 220 may include bracket mounting parts 210M and 220M formed on opposite sides of the surface on which the housing grooves 210G and 220G are formed. The bracket mounting part 210M of the first cell frame 210 and the bracket mounting part 220M of the second cell frame 220 are configured to be coupled to brackets and may have the shape of tongs.

Brackets extending along the first direction may be mounted on these bracket mounting parts 210M and 220M. When the battery cell 110 expands, the bracket mounting parts 210M and 220M may move along the bracket. For this purpose, the bracket mounting parts 210M and 220M are opened along the first direction d1, and may have a closed tongs shape along a direction perpendicular to the first direction d1.

The brackets mounted on the bracket mounting parts 210M and 220M will be described later together with FIGS. 16 and 17.

Next, a battery pack according to one embodiment of the present disclosure will be described in detail with reference to FIGS. 16 to 18 and the like.

FIG. 16 is a perspective view showing another battery pack according to one embodiment of the present disclosure. FIG. 17 is an exploded perspective view showing a state in which a battery module and a pack housing included in the battery pack of FIG. 16 are separated. FIG. 18 is a front view of the battery pack of FIG. 16.

Referring to FIGS. 16 to 18, the battery pack 1000 according to one embodiment of the present disclosure includes a battery module 100, a pack housing 1100 that houses the battery module 100, and a pair of vertical beams 1200 arranged on the bottom part 1100F of the pack housing 1100 so as to be perpendicular to one surface of the bottom part 1100F of the pack housing 1100. The battery module 100 is arranged between a pair of vertical beams 1200. The battery module 100 is the battery module according to the present embodiment that includes a battery cell stack, a side plate, a busbar frame, and a disk spring as described above.

As described above, in the battery module 100, the battery cell group 110G is stacked along the first direction d1 to form a battery cell stack, and each of the battery cell group 110G may include a first cell frame 210 or a second cell frame 220. The first cell frame 210 and the second cell frame 220 may be formed with bracket mounting parts 210M and 220M. The details concerning each configuration described above overlaps with the contents described above, and therefore, is omitted herein.

At this time, the bracket 1300 extending along the first direction d1 may be mounted on the bracket mounting parts 210M and 220M. Specifically, the bracket 1300 may include at least one of an upper bracket 1310 and a lower bracket 1320.

The upper bracket 1310 is shown in FIG. 16, a lower bracket 1320 is shown in FIG. 17, and in FIG. 17, illustration of the upper bracket is omitted.

The upper bracket 1310 may be mounted on the bracket mounting part 210M of the first cell frame 210. The upper bracket 1310 may include a bar portion extending along the first direction d1 so as to be mounted on the tongs-shaped bracket mounting part 210M.

Further, the upper bracket 1310 may be assembled to a pair of vertical beams 1200. Both ends of the upper bracket 1310 may be bent downward to be assembled to the vertical beam 1200. The assembly method between the upper bracket 1310 and the pair of vertical beams 1200 is not particularly limited, and adhesives, weld junction, bolt assembly or the like can be applied.

The lower bracket 1320 may be mounted on the bracket mounting part 220M of the second cell frame 220. The lower bracket 1320 may include a rod part extending along the first direction d1 so as to be mounted on the tongs-shaped bracket mounting part 220M.

Further, the lower bracket 1320 may be attached to the bottom part 1100F of the pack housing 1100. The attachment method between the lower bracket 1320 and the bottom part 1100F is not particularly limited, and adhesives, weld junction, bolt assembly or the like can be applied.

The bracket 1300 including the upper bracket 1310 and the lower bracket 1320 has a form extending along the first direction. Since the bracket mounting parts 210M and 220M have a tongs shape that is opened along the first direction d1 and closed along the direction perpendicular to the first direction d1, the bracket mounting parts 210M and 220M can move along the bracket 1300 when the battery cell 110 expands.

Meanwhile, the busbar frame 400 according to the present embodiment may be bolted and assembled to the pack housing 1100. Specifically, the busbar frame 400 may formed with a mounting hole 410H penetrating along the height direction. Here, the height direction is a direction perpendicular to both the first direction d1, which is the stacking direction of the battery cells 110, and the direction in which the electrode leads 111 and 112 protrude, and means the direction parallel to the z-axis direction as described above.

Although not specifically shown in the figure, a long bolt may pass through the mounting hole 410H to be assembled to the bottom part 1100F of the pack housing 1100. A through hole formed with a screw thread may be formed on an inner surface of the bottom part 1100F.

That is, when fixing the battery module 100 to the pack housing 1100 in the battery pack 1000, assembly between the busbar frame 400 and the pack housing 1100 can be applied in addition to the coupling of the upper bracket 1310 and the pair of vertical beams 1200 described above.

Meanwhile, although not specifically shown in the figure, a foam may be injected into the space between the first cell frames 210 at the upper part of the battery cell stack 120 and the space between the second cell frames 220 at the bottom part of the battery cell stack 120. This foam may include a silicone material. This foam can perform a role like a kind of spring that repeats compression and expansion up to a certain pressure. When high swelling occurs in the battery cells 110, the foam repeating compression and expansion may provide structural flexibility to the battery module 100 and may help prevent damage such as cracks from occurring on the side surface of the battery cell 110.

Taken together, the battery module according to the present embodiment can realize a moving structure that allows displacement of the battery cells 110 through the side plates 600 and the disk spring parts 700 when swelling of the battery cells 110 occurs. In addition, since the side plate 600 is configured in the form of a leaf spring, it can help control the swelling of the battery cells 110 and allow displacement and movement of the battery cells.

Further, the arrangement of the first and second cell frames 210 and 220 and the zigzag-shaped heat sink 300 including the bent part 310B may be combined to realize moving frame structure. This moving frame structure provides structural flexibility and fluidity for swelling of the battery cell, thereby being able to alleviate the variation in pressing force and prevent the generation of damage such as crack in the battery cell.

From the viewpoint of the battery pack 1000, the battery module 100 is mounted and fixed to the pack housing 1100 through coupling between the upper bracket 1310 and the vertical beam 1200 and bolt assembly of the busbar frame 400. Other than the fixing part, there is no structure for limiting the displacement movement of the battery cell, such as a separate mechanism or module frame, and a moving frame structure that is easy to move the battery cell is provided as mentioned above, thereby capable of maximizing structural flexibility and fluidity for swelling of the battery cell.

Further, by injecting a foam that repeats compression and expansion up to a certain pressure, the stress generated in the pouch when swelling occurs is minimized.

Therefore, in the case of the battery module and the battery pack according to the present embodiment, it is possible to extend the battery life by reducing the deviation of the pressing force applied to each battery cell when swelling of the battery cell occurs, and the conventional module frame or pad is unnecessary and the number of parts can be reduced.

Further, when applying battery cells with high swelling, such as pure Si cells, all-solid-state batteries, and high-SiO-content cells, even at a high pressure level of 3-8 Mpa at EOL (End Of Life), structural damage to battery cells or battery modules can be prevented through the moving frame structure.

The terms representing directions such as the front side, the rear side, the left side, the right side, the upper side, and the lower side have been used in the present embodiment, but the terms used are provided simply for convenience of description and may become different according to the position of an object, the position of an observer, or the like.

The one or more battery modules according to embodiments of the present disclosure described above can be mounted together with various control and protection systems such as a BMS (battery management system), a BDU (battery disconnect unit), and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

Although the invention has been described in detail above with reference to preferred embodiments of the present disclosure, the scope of the present disclosure is not limited thereto, and various modifications and improvements can be made by those skilled in the art using the basic concepts of the present disclosure, which are defined in the appended claims, which also falls within the scope of the present disclosure.

The invention claimed is:

1. A battery module comprising:

a battery cell stack including a plurality of battery cells arranged along a first direction;

side plates covering each of opposite side surfaces of the battery cell stack along the first direction, respectively;

a busbar frame covering one surface of the battery cell stack in a direction in which electrode leads of the plurality of battery cells protrude; and a disc spring part located on an outside of a side plate of the side plates, wherein the disc spring part is compressed in a direction parallel to the first direction, and wherein the side plate has a form in which a plurality of leaf spring members are arranged at intervals along a height direction of the side plate.

2. The battery module of claim 1, further comprising:

a fixing member that sequentially passes through the disc spring part and the side plate along a direction parallel to the first direction and couples to the busbar frame.

3. The battery module of claim 2, wherein:

the fixing member comprises a fastening part formed with a screw thread, and a head part having a larger diameter than the fastening part, the fastening part sequentially passes through the disc spring part and the side plate and couples to the busbar frame, and the disc spring part is located between the side plate and the head part.

4. The battery module of claim 1, wherein:

the electrode leads of the plurality of battery cells protrude in a direction perpendicular to the first direction with respect to the battery cell stack, pass through lead slits formed in the busbar frame and then are bent and joined to a busbar mounted on the busbar frame.

5. The battery module of claim 1, wherein:

the side plate is in a form of a leaf spring that is recessed in a direction in which the battery cell stack is located.

6. The battery module of claim 1, wherein:

battery cell groups including at least one battery cell of the plurality of battery cells are arranged along the first direction to form the battery cell stack, and each of the battery cell groups comprises a first cell frame located on an upper part of the at least one battery cell, or a second cell frame located on a lower part of the at least one battery cell of the plurality of battery cells.

7. The battery module of claim 6, further comprising a heat sink that contains a cooling tube in which a coolant flows inside, wherein the cooling tube comprises bent parts in a bent form, and wherein any one of the bent parts surrounds opposite side surfaces of any one of the battery cell groups and the first cell frame, another one of the bent parts surrounds the opposite side surfaces of another of the battery cell groups and the second cell frame, and the cooling tube continues in a zigzag shape.

8. The battery module of claim 6, wherein:

each of the first cell frame and the second cell frame comprises a housing groove in which the at least one battery cell is seated, and a bracket mounting part formed on a surface opposite to a surface on which the housing groove is formed, and a bracket that continues along the first direction is mounted on the bracket mounting part.

9. The battery module of claim 8, wherein:

when the at least one battery cell expands, the bracket mounting part moves along the bracket.

10. A battery pack comprising:

the battery module of claim 1;

a pack housing that houses the battery module; and a pair of vertical beams that are arranged on a bottom part of the pack housing so as to be perpendicular to one surface of the bottom part of the pack housing, wherein the battery module is arranged between the pair of vertical beams.

11. The battery pack of claim 10, wherein:

the busbar frame is bolted and assembled to the pack housing.

12. The battery pack of claim 10, wherein:

battery cell groups including at least one battery cell of the plurality of battery cells are arranged along the first direction to form the battery cell stack, and each of the battery cell groups comprises a first cell frame located on an upper part of the at least one battery cell, or a second cell frame located on a lower part of the at least one battery cell of the plurality of battery cells.

13. The battery pack of claim 12, wherein:

each of the first cell frame and the second cell frame comprises a housing groove in which the at least one battery cell is seated, and a bracket mounting part formed on a surface opposite to a surface on which the housing groove is formed, and a bracket that continues along the first direction is mounted on the bracket mounting part.

14. The battery pack of claim 13, wherein:

the bracket comprises an upper bracket that is mounted on the bracket mounting part of the first cell frame, and the upper bracket is assembled to the pair of vertical beams.

15. The battery pack of claim 13, wherein:

the bracket comprises a lower bracket that is mounted on the bracket mounting part of the second cell frame, and the lower bracket is attached to the bottom part of the pack housing.

16. The battery pack of claim 13, wherein:

when the at least one battery cell expands, the bracket mounting part moves along the bracket.

* * * * *